United States Patent [19]

Morser et al.

[11] Patent Number: 5,005,135

[45] Date of Patent: Apr. 2, 1991

[54] DYNAMIC CORRECTION OF SERVO FOLLOWING ERRORS IN A COMPUTER-NUMERICALLY CONTROLLED SYSTEM AND FIXED CYCLE UTILIZING SAME

[75] Inventors: Alfred H. Morser; Walter M. Gildemeister, both of Cincinnati; David M. Farmer, Loveland, all of Ohio

[73] Assignee: Cincinnati Milacron, Inc., Cincinnati, Ohio

[21] Appl. No.: 327,324

[22] Filed: Mar. 22, 1989

[51] Int. Cl.$^5$ .............................................. G05B 19/24
[52] U.S. Cl. .......................... 364/474.35; 364/474.29; 318/571
[58] Field of Search ...................... 364/474.29, 474.30, 364/474.31, 167.01, 172, 474.28, 474.35; 408/12, 13; 318/571–573

[56] References Cited

U.S. PATENT DOCUMENTS

| | | | |
|---|---|---|---|
| 3,979,653 | 9/1976 | Cutler | 318/571 |
| 4,070,608 | 1/1978 | Rosshirt et al. | 318/572 |
| 4,503,493 | 3/1985 | Burkhardt et al. | 364/474.29 |
| 4,543,625 | 9/1985 | Nozawa et al. | 364/174 |
| 4,616,385 | 10/1986 | Wheeler | 29/27 C |
| 4,879,660 | 11/1989 | Asakura et al. | 364/474.15 |

*Primary Examiner*—Jerry Smith
*Assistant Examiner*—Paul Gordon
*Attorney, Agent, or Firm*—Wood, Herron & Evans

[57] ABSTRACT

The invention relates to servo-driven computer-numerically-controlled systems of the type adapted to receive part program instructions defining a desired path of relative movement between a tool and a workpiece, wherein the path may include an interior or exterior curved portion to be effected by coordinated linear movement of machine members along at least two orthogonal linear axes. The invention provides apparati and methods for correcting path radius errors to facilitate rapid and accurate movement along the curve. In a preferred embodiment, such path radius correction is applied to a fixed cycle for machining inside circles preferably incorporating such path radius correction and providing substantially tangential engagement between the tool and a machining locus orbited by the tool to avoid abrupt accelerations or decelerations while the tool is in contact with the workpiece. In addition to avoiding surface blemishes, this facilitates machining a broader range of hole sizes with a given sized tool thereby reducing the need for frequent tool changes. The invention carries out path radius correction by generating position commands received by the servo using corrected radius data, the difference between which and the desired radius to be machined compensates for at least a portion of the path radius error that would otherwise be generated by the servo. Apparatus and methods for threading holes using a non-helical threading tools with or without path radius correction are also disclosed.

57 Claims, 8 Drawing Sheets

DYNAMIC CORRECTION OF SERVO FOLLOWING ERRORS IN A COMPUTER-NUMERICALLY CONTROLLED SYSTEM AND FIXED CYCLE UTILIZING SAME

BACKGROUND OF THE INVENTION

I. Field of the Invention

This invention relates to computer-numerically-controlled (CNC) systems such as CNC machining systems. More particularly, the present invention relates to an apparatus and method for correcting for servo following errors along curved portions of a programmed path of relative motion between a tool and a workpiece. A further principal aspect of the present invention relates to an apparatus and method for machining holes with a rotating tool, preferably using such radius correction, to facilitate rapid and accurate machining of holes over a wide range of diameters without need of changing tools.

II. Description of the Prior Art

By way of background, servo driven computer-numerically-controlled systems, such as machining systems, operate on a workpiece such as a part to be machined to a desired form, by effecting relative movement between the workpiece and a tool such as a rotating cutter or non-helical threading tool. A desired path of relative movement along various axes as well as other functions needed to machine the part are specified by program instructions which can be expressed in various forms such as the well known and widely used part programming language specified by EIA Standard RS-274. While those skilled in the art are thoroughly familiar with RS-274 programming, others will benefit from a brief explanation.

RS-274 programs consist of a series of blocks. Each block contains the commands required to perform a single step in the machining operation such as moving a tool at a specified feedrate from one location to another. The workpiece is machined by executing one block after another until all desired operations to be performed on the workpiece are completed.

Normal RS-274 block syntax consists of a sequence number followed by a preparatory code followed by one or more words and an end of block code. The sequence number provides a humanly identifiable reference to the block while the block label enables the specification of targets for branches or jumps. Each word includes a letter address followed by either a floating point number or a mathematical expression. Commonly used RS-274 letter addresses are as follows:

| | |
|---|---|
| X, Y, Z | Primary Linear Axes |
| U, V, W | Secondary Linear Axes |
| A, B, C | Primary Rotary Axes |
| I, J, K | Interpolation Parameters (e.g. Arc center point; thread lead) |
| F | Feedrate (e.g. spindle start/stop coolant, etc.) |
| S | Spindle Speed |
| T | Tool Code |
| P | Arc Radius (used with G02 or G03) |

A floating point number following each letter address indicates a desired value for the word. For example: P 10.185 may be used to program an arc having a radius of 10.185 units.

RS-274 programs utilize a variable block length format. Only commands pertaining to new functions or changes from previously programmed values need be programmed in a later block. Therefore, once a word such as a desired feedrate is programmed, subsequent blocks need not include an F word until a change is desired.

The preparatory code (consisting of a G prefix followed by a number) defines the nature of the operation to be performed. Examples of standard RS-274 preparatory codes include:

| | |
|---|---|
| G00 | Point to Point positioning |
| G01 | Linear interpolation |
| G02 | Circular interpolation arc CW |
| G03 | Circular interpolation arc CCW |
| G17, G18, G19 | Plane selectors |
| G40, G41, G42 | Cutter Compensation Mode Selectors |
| G90, G91 | Absolute/Incremental Dimension Input Selections |
| G93, G94, G95 | Feedrate Mode Selectors |

Still other preparatory codes such as those in the G80 through G89 series or user definable preparatory codes serve to indicate fixed cycle expansions of the type to be described shortly.

In a conventional CNC machining system such as one utilizing a control such as the ACRAMATIC ® 950 available from Cincinnati Milacron, Inc. of Cincinnati, Ohio, a program for machining a workpiece is received for execution by a block processor which translates each block of RS-274 code into a machine recognizable numerical form. The block processor checks for errors by performing lexical and syntactical scans. It also evaluates any mathematical expressions which may be included in the block. The block processor then develops a block table including entries for each word which might be included in any given block. For each word, the table includes an entry indicating whether the word is present and if so, its numerical value.

In addition to handling simple program blocks representing individual moves along one or more axes, it is conventional in a number of modern CNC control systems, including the ACRAMATIC ® 950, to be capable of invoking, by means of a single, parameterized instruction, a fixed cycle expansion subroutine consisting of a series of part program blocks. While such subroutines (which are in the nature of the so-called "expanded macros" in assembly language programming) are referred to by different names by different CNC control manufacturers, they are referred to herein as "fixed cycles". Fixed cycles are sometimes referred to using the terms "G code subroutines" or "G subs".

Fixed cycles are extremely useful in that they facilitate rapid programming of commonly repeated functions without need of setting out in the part program each line of code embodied in the fixed cycle. They can also be used to modify or limit part program instructions such as feedrate instructions. A number of commonly recognized fixed cycles are those invokable by RS-274 commands of the G-80 series (G80 through G89). However, a number of modern CNC controls such as the ACRAMATIC ® 950 include facilities for running user-defined fixed cycles which can be invoked using other G codes. As will be explained hereinafter, the present invention may conveniently be implemented in otherwise conventional controls by exploiting the capability to carry out fixed cycles.

In the event the block processor encounters a block including a G code which does not correspond to a simple function, it consults a directory of G codes indicating which fixed cycles are present in a "G sub Store" memory area. Provided the G code is one designating an available fixed cycle, the system enables a G code expander which has access to data from the block table prepared by the block processor as well as a series of temporary registers which, in the ACRAMATIC ® 950 are designated $T_{1-99}$. The G code expander directs the block processor to the stored fixed cycle. This has the same effect on operation of the system as effectively inserting the blocks of the fixed cycle into the part program at the point where the fixed cycle G code appears. In response to a data request issued by a span processor, information from the block processor is transferred to the span processor whereupon the block processor takes up the next block from the fixed cycle. When the last block in the fixed cycle is reached, the G code expander is disabled and execution continues with the next block appearing in the part program.

The span processor prepares spans for execution. Provided proper part programming practices are followed, a series of spans (i.e. moves) are prepared well in advance of the time of their execution as machine motion. This allows implementation of the present invention as well as full exploitation of certain features to be described which require information concerning blocks to be executed somewhat remotely in time. The span processor includes a series of functional stages which are conventional in the art. The first of these stages, the block value calculator receives information from the block processor, performs a semantic check, executes any required conversion of units (e.g. English to metric), and fills in any values in the block table which, although not expressly programmed in a given block, are assumed to be present by default in subsequent blocks in accordance with previously programmed values.

A number of the other functional stages may also be included within the span processor. For example, some CNC controllers include a radius/fillet stage which provides the capability to insert appropriate radius and fillet instructions without need of including them expressly in the part program. Cutter diameter compensation (CDC) may be embodied in yet another stage. When invoked, this feature automatically performs the calculations needed to position a tool properly in accordance with its diameter so that a given workpiece surface dictated by the part program can be generated with tools of various diameters.

Where the path generator of a CNC machine controller is capable of accessing only limited arcuate movement data, such as single quadrant arcs, the span processor includes another stage for dividing data representing multi-quadrant arcs into a plurality of single quadrant arcs. A final geometry stage provides any offsets needed to account for the geometrical configuration of the machine itself. Finally, an acceleration/deceleration (ACC/DEC) stage examines a series of spans in advance of their execution for discontinuities such as unacceptably abrupt changes in direction or improperly coordinated multi-axis moves and develops suitable real time velocity profiles for each axis as required to maintain dynamic path accuracy. As their preparation via the above stages is completed, spans are loaded into a buffer from which they are available for span execution.

Span execution includes two principal functions which are carried out in ways well known in the art. These are sequencing of commands and interpolation. Sequencing insures that consecutive spans will be executed in proper order and that for each individual span, start span, move and end span operations will occur in proper order. For example, if a linear axis motion command, a spindle stop command and a spindle start command all appear in the same block of a part program, the sequencing function guarantees that the spindle will begin its rotation before the axis motion takes place and that the spindle will not stop until the axis motion is complete.

Interpolation involves resolving a command for a gross movement into series of small incremental position commands. Thus, while a span may call for moving along one or more axes from a starting point (usually the present position) to a defined end point some distance away or along an arc of a certain radius and center point to an end point, interpolation defines a series of short, finite moves between a series of intermediate points linking the starting point and the end point.

Following the span execution stage, span data for each axis is transferred to a respective path generator for that axis. The path generators develop a position command for each axis specifying desired position as a function of time. The position command for each axis is summed with an independent position command for that axis. The latter position commands are generated by what shall be referred to as an "independent motion controller" because the position commands generated by it (in a manner analogous to that described above) are independent of the part program. Instead, the position commands from the independent motion controller are generated by a separate program which usually runs on a programmable controller which interfaces with the main controller and with the machine by way of a machine applications interface (MAI). That program generates moves required for tool changes, pallet shuttle, alignment, jogging and other human operator-initiated functions. The two position commands for each respective axis are then summed and input to the servo stage for that axis.

The servo includes a separate servo stage for each axis. Each servo stage includes a position loop having a characteristic gain factor, ($K_v$). The position loop receives position commands as well as a position feedback signal in order to generate a velocity command. Each servo also includes a velocity loop usually characterized by a non-zero integral time factor, ($T_i$) The velocity loop receives the velocity command from the position loop as well as a velocity feedback signal to generate a current signal which drives a motor coupled to the movable machine member (e.g. slide) for that axis. The motor is typically coupled mechanically to a tacho which generates the velocity feedback signal to the velocity loop. Generation of the position feedback signal is accomplished by means of a position feedback device such as a resolver or LVDT which may be mechanically coupled to either the drive motor or the movable machine element itself.

Prior art CNC machining controls particularly the ACRAMATIC ® 950 may be even further understood with reference to the following publications each of which are available from Cincinnati Milacron, Inc. and are expressly incorporated herein by reference in their entireties:

Control Operation Manual for Cincinnati Milacron ACRAMATIC ® 950 MC/PC Rel. 1.0 Computer Numerical Control Publication No. 7-000-0535-BM issued Jan. 12, 1989;

Control Maintenance Manual for Cincinnati Milacron ACRAMATIC ® 950 Rel. 1.0 Computer Numerical Control Publication No. 7-000-0535-MA issued May 20, 1988, and Part Programming Manual for Cincinnati Milacron ACRAMATIC ® 950 MC/PC Rel. 1.0 Computer Numerical Control Publication No. 7-000-0535-PM issued Dec. 14, 1988.

When prior art systems of the type just described are used to move a tool along a curved path of either an inside or an outside curve, the actual path followed by the tool will not conform closely to the path defined by the part program unless the radius of curvature is relatively large and/or the feedrate is low. The path radius error, i.e. the difference between the programmed path and the path actually traversed by the tool, increases significantly as the radius of curvature decreases and/or the feedrate increases Therefore, when machining a path having a small radius of curvature, it is necessary to move the tool much more slowly along the curve than cutting considerations alone will permit if path radius error is to be kept small. This limits productivity and adds to the cost of goods produced.

While path radius error is of concern when machining curves in general (except at relatively large radii and/or low feedrates), it is of particular concern when it is desired to machine relatively small diameter holes previously bored in a workpiece to a precise, desired size and with a good surface finish.

In the prior art such operations were generally performed by selecting a cutting or grinding tool of a proper size to be mounted on a rotating spindle. The part program would cause the tool to move along a clearance plane to the center coordinates of a bore whereupon the tool would be plunged interiorly of the bore to a desired depth. The tool would then be moved radially into contact with the surface of the bore and beyond until the tool reached the radial position corresponding to the desired size of the hole. Thereafter, the rotating cutter would be orbited 360 degrees at programmed feedrate to machine the hole to size. Upon completion of its orbit, the cutter would be withdrawn radially from the work surface to the interior of the hole from which location it could be raised to the clearance plane and be moved to the coordinates of any like-sized holes to be machined in a similar way.

If the remaining holes to be machined were of a substantially different size, they often could not be machined until a tool of a different size was selected and exchanged for the old tool. Obviously, the tool could be no larger than the diameter of the bore into which it was to be inserted. On the other hand, in order to acceptably limit surface discontinuities at the region where the tool first radially engaged the cutting path, it was generally preferred to select a tool whose diameter was fairly large in relation to the diameter of the hole to be machined so that the curvature of the tool and the hole would be similar. As an alternative to forming holes by milling or grinding, bores were often reamed to form holes of various sizes. In that case, a different reamer would have to be used for each different size of hole. Therefore, regardless of whether holes formed by milling, grinding or reaming, frequent tool changeovers would often be necessary when machining a plurality of holes of different sizes.

Even more importantly, as when machining curves in general, when machining holes, path radius error increased markedly as the radius of the hole decreased and/or the feedrate increased. Therefore, accurate machining of small holes was often slower than permitted by metal cutting considerations. The prior art also entailed a number of other practical disadvantages.

Because the tool engaged the work radially before orbiting and disengaged the work radially after orbiting, abrupt changes in direction along certain linear axes would be required in order to stop and start radial motion in order to respectively commence and end orbital motion. In order to execute these sudden changes of direction with accuracy, the transient response of the system required precise adjustment. Even then, such motion abrupt changes could generate large accelerations and decelerations and therefore, large reaction forces which could possibly perturb the positional relationship between the machine and the workpiece and produce blemishes on the workpiece. Also, because the tool would have to be both accelerated and decelerated along the orbit while machining the work, different portions of the orbit would be machined at different tangential velocities. As a result, the interior of the machined hole would be likely to exhibit a non-uniform surface finish. Moreover, such accelerations and decelerations added significantly to the cycle time required to form the hole.

Threading holes using prior art systems posed further problems. One commonly used technique was to use a tap of a diameter selected in accordance with the diameter of the hole to be threaded. The tap would be rotated in a given direction while being moved axially of the hole to form threads along the wall of the hole to a desired depth. As the desired thread depth increased so did the time required to form the thread. Also, once the tap was inserted to the desired thread depth, it could not simply be retracted while rotating in the same direction without destroying the tap and/or the threads. Instead, rotation of the tap in its original direction would have to be stopped and then reversed while the tap was axially retracted. Before the next hole of the same size could be threaded the rotation of tap would have to be stopped and reversed yet again. The finite acceleration and deceleration times required to effect these changes in rotary direction could add significantly to the machining time. Another significant drawback to tapping in cases where it was required to thread a plurality of holes of different diameters is that for each different hole size, a different tap was required—even if the thread size were the same. This too would increase the time required to machine the part.

As an alternative to tapping, it has been known in the prior art to form threads using a non-helical cutting tool, the diameter of which is smaller than the hole being threaded. Such a tool would be inserted interiorly of the hole to a desired depth at a rapid rate prior to threading and then moved radially into contact with the wall of the hole to begin cutting threads. The cutter would then be orbited one or more times around the hole while simultaneously being moved axially to form threads of a desired depth and pitch. Upon completion of threading, the cutter would be withdrawn radially toward the center of the hole clear of the work surface and retracted from the hole without need of changing its direction of rotation. Also, the same tool could be used to thread holes of different diameters having the same thread size.

Despite these relative advantages, this technique suffered from disadvantages similar to those of machining technique described above. Most notably, radial engagement and disengagement of the tool would subject the machine to undesirable reaction forces. Also due to the need to accelerate and decelerate the tool at the beginning and end, respectively of its orbit cycle times would be lengthened considerably and the threads in different areas of the hole would be formed at different tangential velocities and therefore subject to surface non-uniformities. Moreover, if the hole were of relatively small diameter, good path accuracy would require significant feedrate reductions.

III. SUMMARY OF THE INVENTION

In view of the foregoing, it is an object of the present invention to provide apparati and methods for correcting path radius errors in servo-driven CNC systems of the type adapted to receive part program instructions defining a desired path of relative movement between a tool and a workpiece wherein the path may include an interior or exterior curved portion to be effected by coordinated linear movement of machine members along at least two orthogonal linear axes, such correction facilitating rapid and accurate movement along the curve.

Another object of the invention is to provide apparati and methods for carrying out such path correction using a fixed cycle which may be invoked conveniently using a single parameterized instruction in the part program.

It is a further object of the present invention to provide apparati and methods for machining bores in a workpiece to form or thread holes in ways which avoid the drawbacks attendant to radially engaging and/or disengaging the workpiece and which may be embodied in a fixed cycle.

Yet another object of the invention is to provide machining apparati and methods of the type referred to in the immediately preceding paragraph which include the capability of correcting for path radius errors.

In furtherance of these and other important objectives, we have studied the behavior of servo-driven CNC systems—particularly systems within the broad category of those adapted to receive part program instructions defining a path of relative movement between a workpiece and a tool to be effected by coordinated linear motion of machine members along at least two orthogonal axes at a desired feedrate, F. As a result of such work, we have discovered that in a linear system where the path to be executed includes a curved portion of a desired (i.e. programmed) radius, R, and where the servos driving each axis have suitably matched values of both position loop gain, $K_v$, and velocity loop integral time, $T_i$, the actual radius of motion, R2 can be accurately expressed as:

$$R2 = R + Q - S + U, \quad \text{EQUATION 1}$$

where:

$$Q = F^2/2R\, K_v^2 \quad \text{EQUATION 2}$$

$$S = 2Q\, T_i K_v \quad \text{EQUATION 3}$$

and $$U = Q(T_i F/R)^2. \quad \text{EQUATION 4}$$

We have further discovered that in many practical situations, R2 can be closely approximated as:

$$R2 = R + Q - S. \quad \text{EQUATION 5}$$

Using either of the above EQUATIONS 1 or 5, a path radius error, E may be defined by:

$$E = R2 - R. \quad \text{EQUATION 6}$$

According to a first broad aspect of the invention, methods and apparati are provided for correcting path radius errors in a servo-driven CNC system by generating the position commands received by the servo using corrected radius data, the difference between which and the desired radius compensates for at least a portion of the path radius error that would otherwise be generated by the servo. Such corrected radius data is preferably generated substantially in accordance with either EQUATION 1 or EQUATION 5 and is preferably carried out as part of a fixed cycle. Where the radius of curvature is small but greater than about 0.050 inches and material cutting considerations do not dictate a lower feedrate, such path correction yields significant path accuracy improvements compared to prior art systems operating at the same feedrate. It also permits machining to proceed with acceptable accuracy at significantly higher feedrates than has heretofore been possible.

While the above path radius correction is broadly applicable to either inside or outside machining of curves of any shape, a second broad aspect of the invention relates particularly to inside machining of bores in a workpiece to machine the bore into a hole of larger size or to form a threaded hole. While this aspect of the invention preferably utilizes the path correction referred to above, in its broadest context it need not do so.

According to this second aspect of the invention, a hole is machined by first positioning a tool, such as rotating cutter or a non-helical threading tool, interiorly of a previously formed bore. Next the tool is moved to substantially tangentially engage a machining locus. As that move is executed, the tool is preferably accelerated to a desired orbital velocity so that once the locus is engaged, the tool may commence orbiting around the locus without abrupt changes in velocity. As applied to a threading operation using a non-helical threading tool, the tool while orbiting is simultaneously moved parallel to the axis of the hole at a rate appropriate to form threads of a desired pitch.

Once the tool has completed at least a full orbit, it preferably continues orbiting to retrace the beginning portion of the locus thereby removing any minor discontinuities which may have been formed where the tool initially contacted the work. Thereafter, the tool is substantially tangentially disengaged from the locus and preferably decelerated as it is moved to a clearance position interiorly of the hole. Such tangential disengagement avoids abrupt velocity changes while the tool is in contact with the workpiece and therefore reduces the risk of surface irregularities. Once free within the hole and without changing rotary direction, the cutter can be retracted rapidly to a clearance plane from which it may be moved to the location of another bore to be machined. Using this system, which is preferably implemented using a fixed cycle, the same tool may be used to form or thread holes of varying sizes with the same tool.

These and other objects and advantages of the invention will be apparent to those skilled in the art in light of the present disclosure including the accompanying drawings, the detailed description of the invention and the appended claims.

IV. BRIEF DESCRIPTION OF THE DRAWINGS

FIG. 1 is a perspective sketch showing a typical CNC machining system of a type to which the present invention is applicable illustrating certain axes of movement thereof;

FIGS. 2A and 2B together form a simplified functional block diagram of the system of FIG. 1;

Figure 6A:
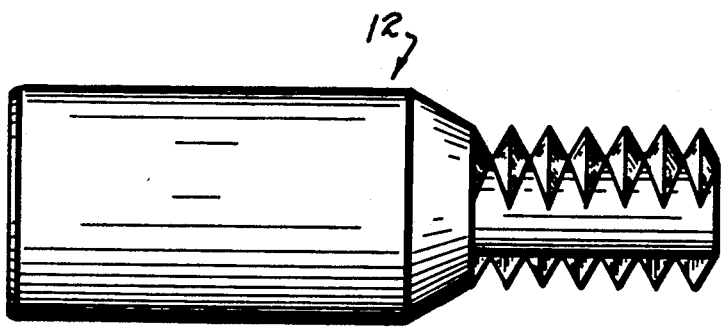
Figure 6B:
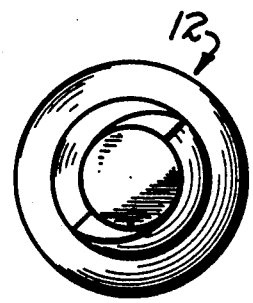
Figure 6C:
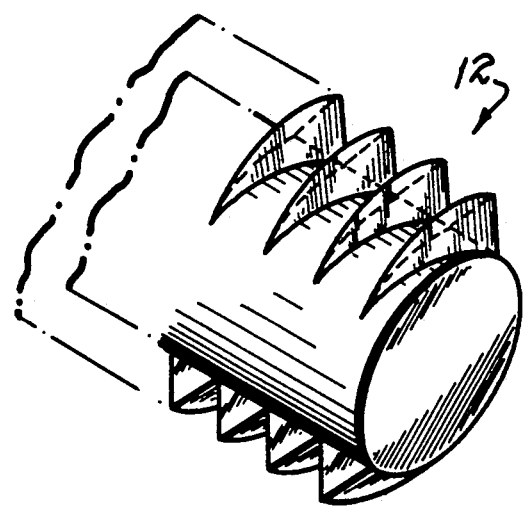

FIGS. 6A, 6B and 6C together show a non-helical threading tool of which:

FIG. 6A is a side view;

FIG. 6B is an end view;

FIG. 6C is a partial perspective view of its thread cutting portion, and

Figure 7:
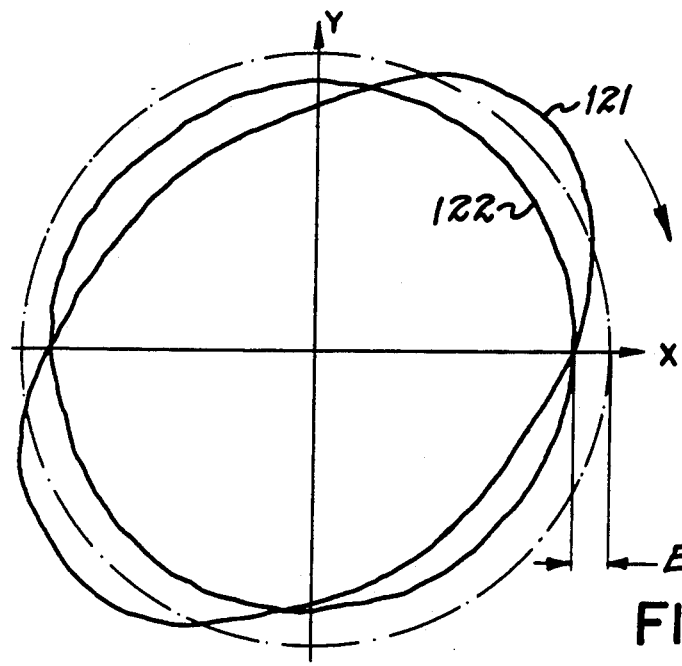
Figure 8:
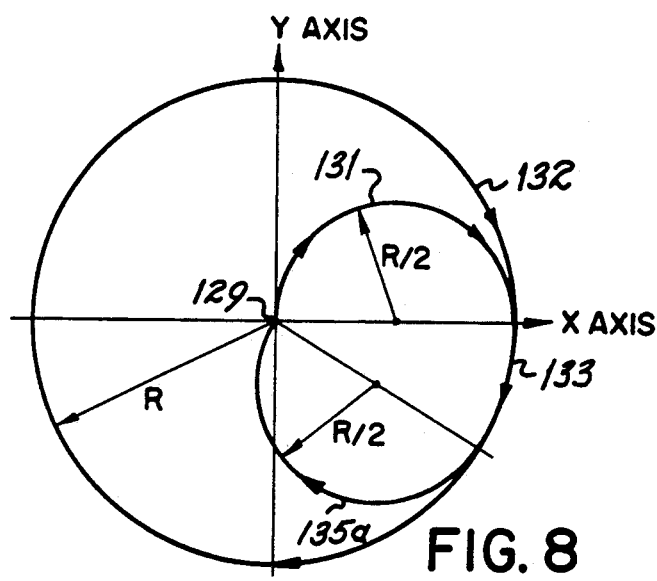
Figure 9:
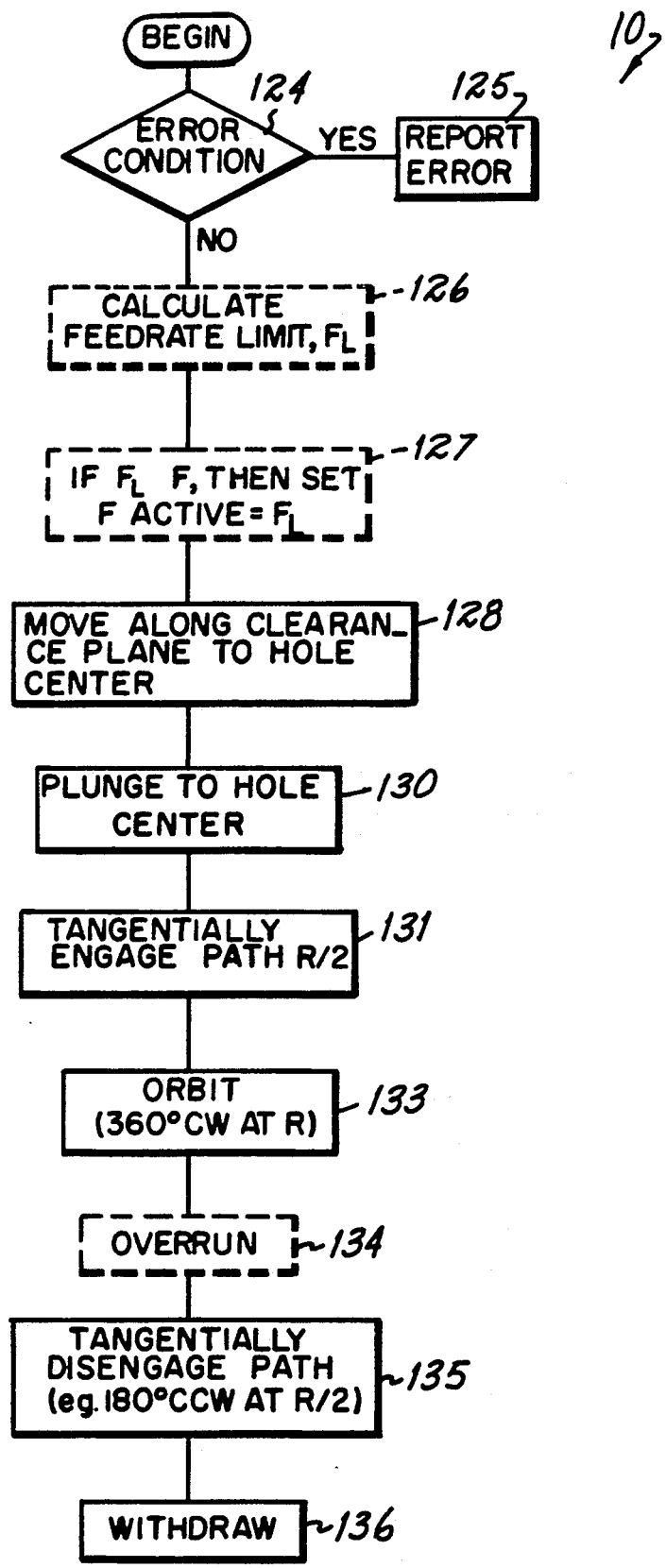

FIG. 7 shows a pair of plots illustrating both mismatching and proper matching of $T_i$;

FIG. 8 is an operational diagram illustrating moves according to the invention for machining holes;

FIG. 9 is a simplified software flowchart of a fixed cycle for carrying out the operations of FIG. 8 in accordance with the invention.

DETAILED DESCRIPTION OF THE INVENTION

Figure 1:
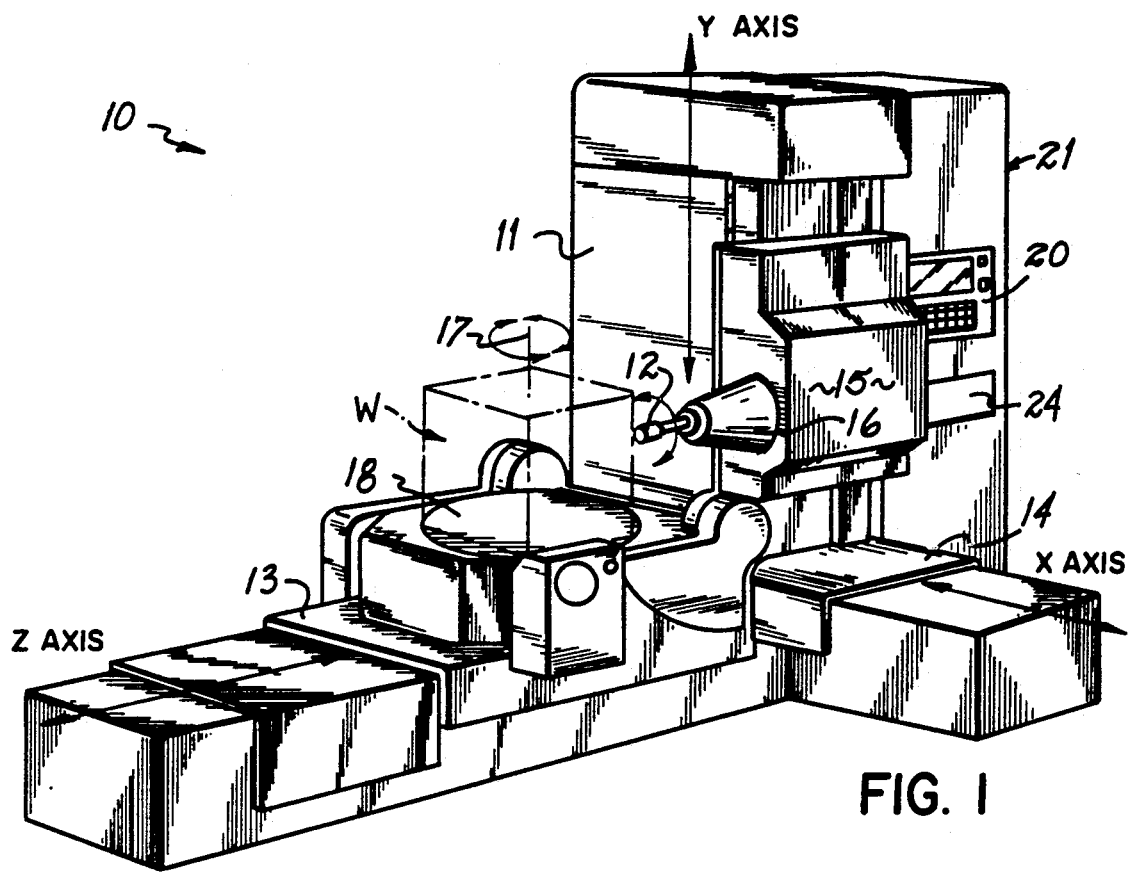

Referring now to FIG. 1, there is shown a computer-numerically-controlled system 10 of a type to which the present invention is applicable. System 10 includes a machine 11 for carrying out relative movement between a tool 12 affixed to the machine and a workpiece, W positioned thereon. This movement is carried out along various axes by means of movable machine members a first of which, 13 supports workpiece W for bidirectional linear movement along a Z axis as illustrated. A second machine member 14 is bidirectionally movable along a linear X axis which lies orthogonal to both the Z axis and a Y axis as illustrated. Bidirectional linear movement along the Y axis is carried out by a third movable machine member 15 which itself is supported on the second movable machine member 14 of machine 11 so that machine 11 can carry out relative movement between tool 12 and workpiece W along a curve in the X-Y plane by effecting coordinated linear movements along the X and Y axes. Member 15 carries a bidirectionally rotatable spindle 16 upon which tool 12 is mounted.

Machine 11 may be of a type which includes a number of other axes of movement. For example, in addition to other linear axes, machine 11 may include additional rotary axes such as rotary axis 17 which is associated with a rotary table 18 supporting workpiece W. However, path correction according to the present invention may be sufficiently described with reference to the linear X, Y and Z axes noted above and is applicable to any servo-driven CNC system such as system 10 wherein relative movement along a curved or circular path can be effected by coordinated linear movement along at least two axes rather than by simple rotational movement. It is further noted that while the present invention is described herein with reference to a machining system, those skilled in the art will recognize that its various aspects are applicable to a wide variety of CNC systems including those adapted to carry out grinding, tape laying and part positioning to name but a few as well as to a wide variety of robotic systems wherein relative curve-linear movement between an element and a member is to be carried out under the control of a servo by coordinated linear movement of machine members along orthogonal axes.

In order to sequence and carry out the relative movements required to machine workpiece W in accordance with a predetermined part program, system 10 includes a controller 20 housed by an electronics cabinet 21. Controller 20, which may suitably comprise a Cincinnati Milacron ACRAMATIC ® 950 programmed in the manner to be described to incorporate the present invention.

Figure 2A:
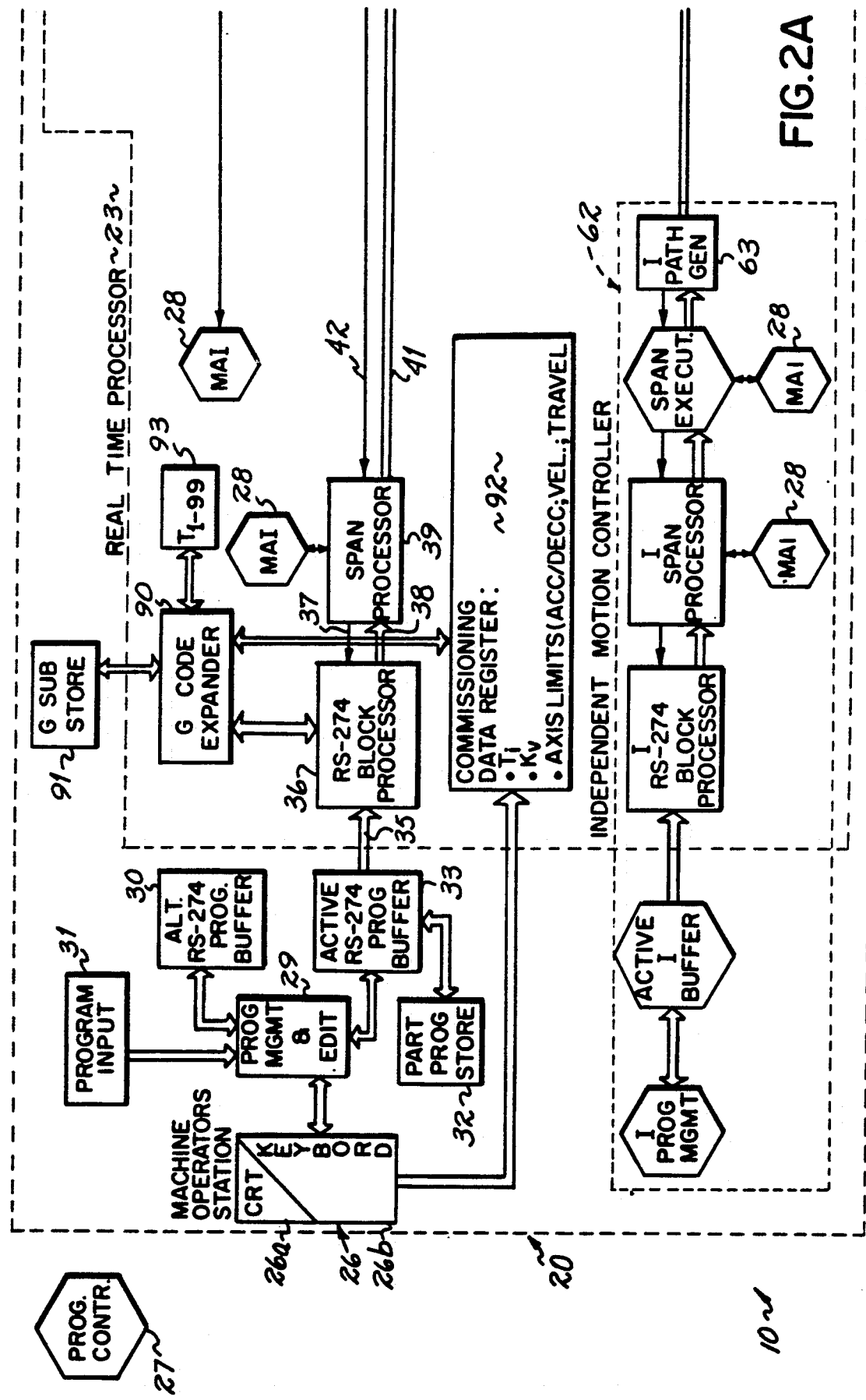
Figure 2B:
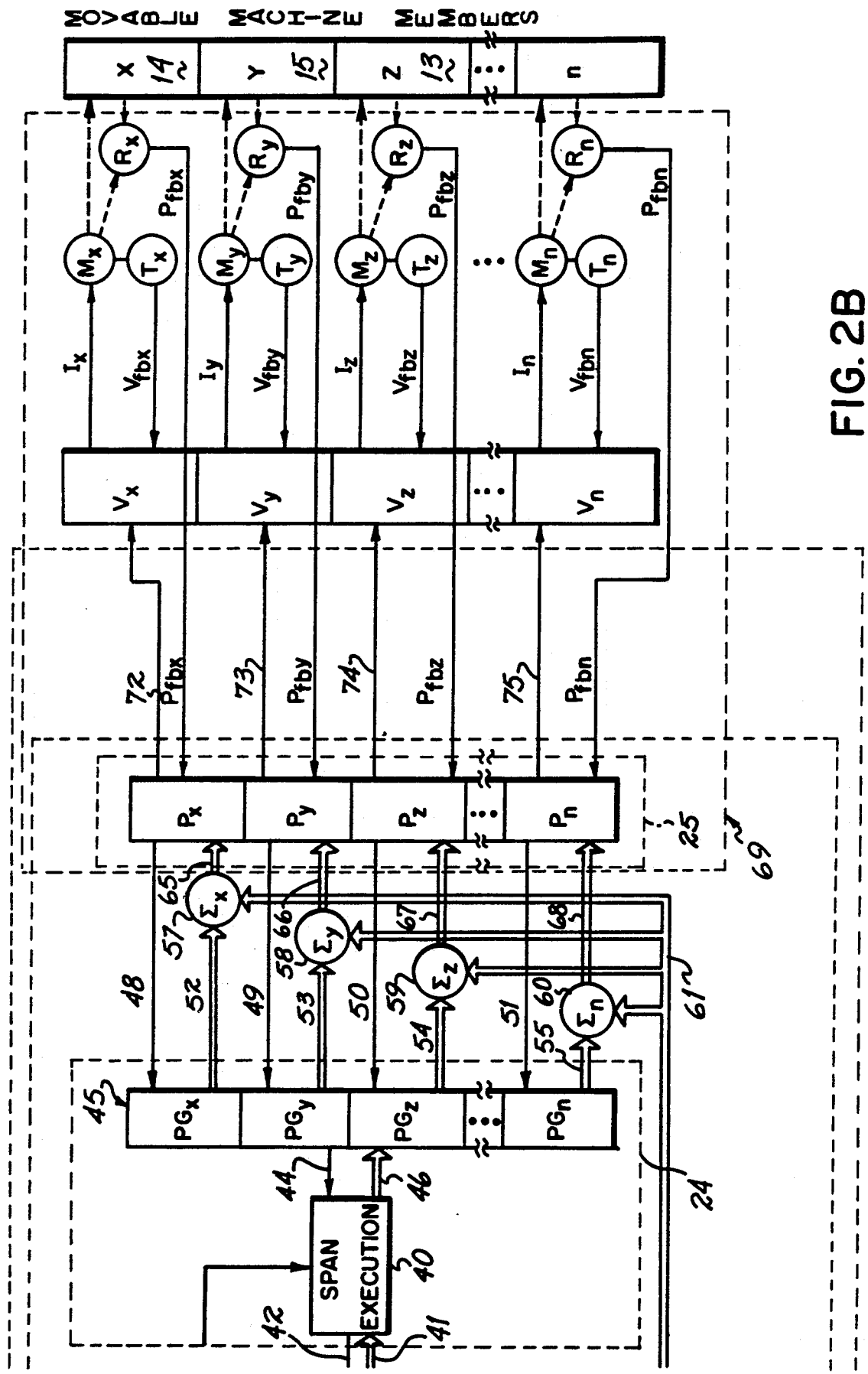

Referring additionally now to FIGS. 2A and 2B, system 10 and particularly controller 20 are illustrated in further detail. Controller 20 is constructed using a multiprocessor architecture which permits a number of tasks to be carried out simultaneously by a real time processor 23. For instance, in the ACRAMATIC ® 950 (which is discussed merely as an illustrative example of a modern CNC control capable of incorporating the present invention and not by way of limitation) includes processors 24 and 25 which carry out the functions illustrated within the dotted line boxes so designated. The functions of controller 20 not carried out by processor 24 or processor 25 are carried out by a third processor which is not specifically shown in FIGS. 2A and 2B. Controller 20 includes an operators, station 26 having an interactive touch screen CRT display 26a and a keyboard 26b. Cabinet 21 also houses a programmable controller 27 which interfaces with controller 20 as well as machine 11 by way of a machine applications interface (MAI) 28 specified by the machine builder.

Except for inclusion of the software required to implement the present invention, system 10 is similar in structure and operation to the CNC systems described earlier with reference to the prior art. Accordingly, only a brief description of FIGS. 2A and 2B is necessary here. It is to observed that programmable controller 27, which is illustrated using a hexagonal box, interfaces with controller 20 at various points which, for the sake of clarity, are also illustrated using hexagonal boxes.

Machine operators' station 26 includes interactive CRT display 26b as well as a keyboard 26b from which part programs may be entered if desired. Machine operators' station 26 communicates with a program manager/editor 29 which facilitates development or editing of programs loaded therein either from keyboard 26b, an alternate RS-274 program buffer 30 or a program input unit 31 which may suitably comprise a serial data link, paper tape reader, disk drive or the like. Completed part programs may be loaded into a part program storage area 32 by way of an active RS-274 program buffer 33 in which a desired part program to be executed by system 10 is stored.

Blocks of program instructions 35 stored in buffer 33 are made available to a conventional RS-274 block processor 36 which, in response to data requests 37, transfers processed block data 38 a conventional span processor 39. Span processor 39 interfaces with a conventional span execution stage 40 to which prepared span data 41 is transferred in response to data requests 42. Both the span processor 39 and the span execution stage 40 communicate with machine application interface 28 to permit proper execution of miscellaneous, spindle and tool instruction codes which are handled by programmable controller 27. In response to data requests 44 issued by a path generator 45, data 46 from the span execution stage 40 is transferred to path generator 45 which includes path generator stages designated $PG_x$, $PG_y$, $PG_z$. . . $PG_n$ corresponding to each respective machine axis X, Y, Z. . . n.

In response to data requests 48, 49, 50 and 51, each path generator stage $PG_x$ through $PG_n$ generates and transmits position command data 52, 53, 54 and 55 to respective summers 57, 58, 59 and 60. Summers 57 through 60 also receive independent position data 61 for each respective axis from an independent motion controller 62. Independent motion controller 62 interfaces with programmable controller 27 as illustrated using hexagonal boxes. In addition to its own block processor, span processor and span execution stage as well as its own program manager and active buffer similar to those already described, independent motion controller 62 includes an independent path generator 63 which generates separate position command data 61 for each axis in response to a program run on programmable controller 27 which program is independent of the main part program. Otherwise, the manner in which controller 62 generates position command data 61 is analogous to the generation of position data 52 through 60 as just described. Like path generator 46, the independent path generator 63 associated with independent motion controller 62 includes a path generator stage (not shown) for each appropriate machine axis.

Summers 57 through 60 combine the position command data from path generator 46 with the independent position command data from path generator 63 to generate total position command data 65, 66, 67 and 68 which are received by a servo 69. Servo 69 includes a position loop 70 having stages $P_x$, $P_y$, $P_z$. . . $P_n$ for each respective axis, which in addition to respective position command data 65 through 68 also receive respective position feedback signals $P_{fbx}$, $P_{fby}$, $P_{fbz}$. . . $P_{fbn}$ generated by respective position feedback devices such as resolvers $R_x$, $R_y$, $R_z$. . . $R_n$. Those resolvers are mechanically coupled to either the movable machine member 14, 15, 13 . . . n associated with each respective axis X, Y, Z . . . n or to the respective motor $M_x$, $M_y$, M . . . $M_n$ driving each movable machine member 14, 15, 13. . . n so that feedback signals $P_{fbx}$ through $P_{fbn}$ represent the actual position of machine members 14, 15, 13. . . n. Each position loop stage, $P_x$ through $P_n$ of position loop 70 generates respective velocity commands 72, 73, 74 and 75 which are received by respective input stages of $V_x$, $V_y$, $V_z$. . . $V_n$ of a velocity loop 76. Each velocity loop stage, $V_x$ through $V_n$ also receives a respective velocity feedback signal $V_{fbx}$, $V_{fby}$, $V_{fbz}$. . . $V_{fbn}$ and generates a corresponding current signal $I_x$, $I_y$, $I_z$. . . $I_n$ received by each respective motor $M_x$ through $M_n$ to mechanically drive movable machine members 14, 15, 13. . . n. Velocity feedback signals $V_{fbx}$ through $V_{fbn}$ are conveniently generated by a velocity feedback device such as tachos $T_x$, $T_y$, $T_z$. . . $T_n$ which are operably coupled to each respective motor $M_x$, $M_y$, $M_z$. . . $M_n$.

Figure 3:
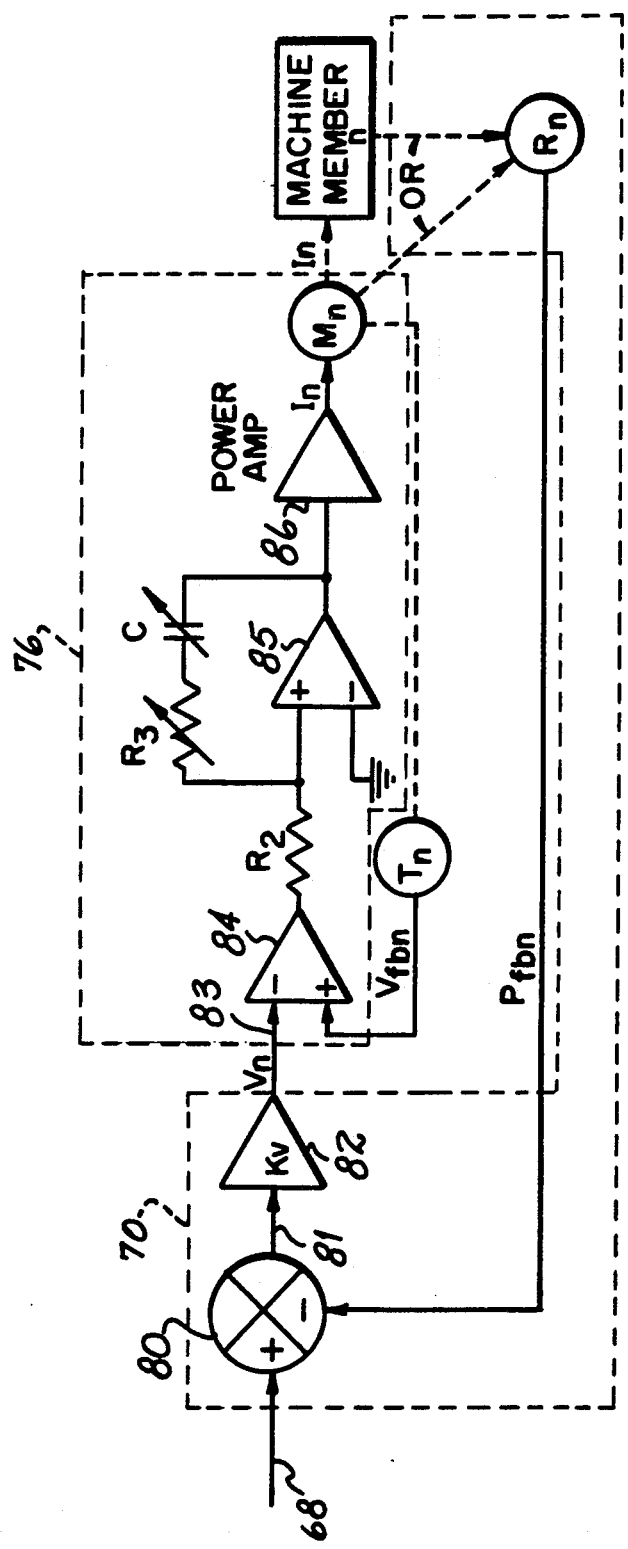
FIG. 3 is a simplified schematic diagram of a typical servo stage from FIG. 2B.

With additional reference now to FIG. 3, a typical servo stage such as the $n^{th}$ stage of serv 69 is shown in further detail. Position command signal 68 generated by the summer 60 following the $PG_n$ stage of path generator 45 is received at a summing junction 80 whereat it is algebraically combined with an actual position feedback signal $P_{fbn}$ representing the actual position of movable machine member n as indicated by position feedback device $R_n$. Summer 80 generates an error signal 81 in accordance with the difference between position command signal 68 and position feedback signal $P_{fbn}$. Error signal 81 is received by an amp 82 having a characteristic position loop gain $K_v$ to generate velocity signal 75 which is input to an amplifier 84 associated with velocity loop 76. Amplifier 84 also receives a velocity feedback signal $V_{fbn}$ from a velooity feedback device such as a tacho $T_n$ operably connected to motor $M_n$. $V_{fbn}$ represents the actual velocity of the movable machine member n. The output of amplifier 84 is connected by way of a series resistor R2 to the noninverting input of a second amplifier 85 whose inverting input is grounded. Amplifier 85 is configured as a partial integrator and has a characteristic integral time, $T_i$, equal to R3*C, where C represents a variable capacitance and R3 represents a variable resistance connected in series between the noninverting input of amplifier 85 and its output. The output of amplifier 85 is fed to a power amp 86 which generates a corresponding current signal $I_n$ which feeds motor $M_n$ which is mechanically coupled to movable machine element n. In this way, servo 69 controls the motion of movable machine member n to effect desired relative movement between tool 12 and workpiece W along the n axis. To generate curve-linear movement in the X-Y plane, servo 69 receives coordinated position command data 65, 66 at the position loop stages $P_x$ and $P_y$ in order to generate respective current signals $I_x$ and $I_y$ in the same manner current signal $I_n$ is generated by velocity loop 76. Simultaneous linear motion of movable machine members 14 and 15 in response to current signals $I_x$ and $I_y$ cause tool 12 to move in a curved path in the X-Y plane.

It has been discovered that when a servo such as the servo 69 of FIG. 2B is used to effect curve-linear motion along two or more orthogonal axes such as the X and Y axis of FIG. 2, the desired radius, R, is related to the actual radius, R2 executed by servo 69 according to EQUATION 1 set forth earlier which may be rewritten as:

$$R = R2 - Q + S - U. \qquad \text{EQUATION 1}$$

It has been further discovered that where machining considerations (e.g. the rate at which a particular material can be machined) do not permit machining at as rapid a feedrate for a given degree of path radius error as correction according to EQUATION 1 would otherwise permit, the U term of EQUATION 1 can be ignored so that the actual radius, R2 may be suitably approximated by EQUATION 5 which has also been set forth above and which may be rewritten as $$R = R2 - Q + S. \qquad \text{EQUATION 5'}$$

Where a desired radius, R, is defined by either EQUATION 1 or EQUATION 5 as may be appropriate in a given machining application, a path radius error, E may be defined by EQUATION 6 above. In order to correct, i.e. substantially eliminate or limit path radius error, E, when carrying out curve-linear motion in for example the X-Y plane, the present invention contemplates the generation of position command data 65 and 66 in response to corrected radius data in order to account for path radius errors. Preferably, such corrected radius data is generated in accordance with desired radius data, R, desired feedrate data, F, which are usually received from the part program together with data previously stored within controller specifying the position loop gain $K_v$ and velocity loop integral time $T_i$ characterizing both the X and Y servo stages.

Where it is desired to machine either an inside or outside surface which includes a portion of desired radius, R, curved in the X-Y plane, the controller 20 of system 10 is programmed to generate position command data 52 and 53 for the X and Y axis in response to corrected radius data, R2. R2 is generated by controller 20 substantially in accordance with either EQUATION 1 or EQUATION 5 below:

$$R2 = R + Q - S + U. \qquad \text{EQUATION 1}$$

$$R2 = R + Q - S. \qquad \text{EQUATION 5}$$

where R is a desired radius specified in the part program;

$$Q = F^2 / 2R\, K_v^2; \qquad \text{EQUATION 2}$$

$$S = 2QT_i K_v, \qquad \text{EQUATION 3 and}$$

$$U = Q(T_i F / R)^2. \qquad \text{EQUATION 4}$$

If the programmed feedrate F is too great in relation to desired radius, R, EQUATIONS 1 and 5 may not provide suitable correction. In that event, it is desirable to limit the feedrate to a limited feedrate, $F_{active}$, where $F_{active}$ is selected not to significantly exceed a feedrate limit, $F_L$ which is preferably generated substantially in accordance with the expression:

$$F_L = 0.10 K_v R^{\frac{1}{2}}. \qquad \text{EQUATION 6}$$

In particular, it is desirable to select $F_{active}$ to equal the lesser of the programmed feedrate, F and the feedrate limit, $F_L$ so that:

$$Q_L = F_{active}^2 / 2K_v^2 \qquad \text{EQUATION 7}$$

$$S_L = 2 Q_L T_i K_v, \qquad \text{EQUATION 8 and}$$

$$U_L = Q_L (T_i F_{active} / R)^2. \qquad \text{EQUATION 9}$$

Thus, where feedrate limiting is to be employed, as is preferable, the corrected radius data, R2 may be expressed as:

$$R2 = R + Q_L - S_L + U_L, \qquad \text{EQUATION 10 or}$$

$$R2 = R + Q_L - S_L. \qquad \text{EQUATION 11}$$

With continued reference to FIG. 2A, Applicants' best mode of carrying out path radius correction according to the present invention by means of a fixed cycle for machining inside circular paths in the X-Y plane will now be described in further detail.

As FIG. 2A illustrates, block processor 36 communicates bidirectionally with a G code expander 90 which can access various fixed cycle subroutines (i.e. fixed cycles) previously stored in a memory area 91 designated G SUB STORE. By way of a commissioning data register 92, G code expander 90 can access commissioning data parameters including stored values of position loop gain Kv and velocity loop integral time characterizing the X and Y axis stages of servo 69 previously entered via keyboard 26b. In addition, in a series of temporary registers $T_{1-99}$, 93 are available to G code expander 90 in order to facilitate storage of parameters including both programmed values and the results of calculations.

Stored within G sub storage memory 91 is a fixed cycle subroutine incorporating path correction according to the present invention. A detailed RS-274 program listing of a fixed cycle embodying path correction according to the present invention is set forth in software Appendix I which forms a part of the present disclosure and which will be readily understood by those skilled in the art. Execution of this fixed cycle is automatically invoked by a single, parameterized part program instruction block including a user-designated preparatory code such as G150. The general syntax for the G150 block is:

G150X??.????Y??.????Z??.????P??.???R??. ???.???

where:

X??.????is the X position of the circle center. The X position is in effect until it is overridden by a subsequent X word or until a data reset is performed;

Y??.????is the Y position of the circle center. The Y position is in effect until it is overridden by a subsequent Y word or until a data reset is performed;

Z??.????is the Z axis plunge depth from the programmed clearance plane. It is programmed as an incremental move (always in the negative direction). The Z depth is in effect until it is overridden by a subsequent Z word or until a data reset is performed;

P'?.????is the clearnce plane. The programmed G150 clearance plane is in effect until i is overridden by a subsequent P word or until a data reset is performed;

R??.????is he desired radius for the circle. The programmed radius is in effect until it is overridden by a subsequent R word or until a data reset is performed, and F??.????is the programmed feedrate of the circle. Feedrate is preferably error limited by the fixed cycle so that observed feedrate, $F_{active}$, may be lower than F. If F is not programmed the modal feedrate is used.

It is to be noted that the fixed cycle program of Appendix I is implemented using the following units which are widely sued in the U.S. machine tool industry:

TABLE I

| Parameter | Units |
|---|---|
| Distance | inches |
| Feedrate | inches/minute |
| Position Loop Gain, $K_v$ | inches/minute/.001 inch servo following error |
| Velocity Loop Integral Time, $T_i$ | milliseconds |

Those skilled in the art will of course recognize that the invention is in no way limited to any particular system of units and that by using appropriate conversion factors' the invention may be implemented using whatever units may be desired.

With additional reference now to the simplified software flowchart of FIG. 4, the salient features of the fixed cycle set forth in Appendix I will now be explained. When the block processor 36 of controller 20 receives a G150 block of the form described above, the block processor 36 consults a stored G code directory which indicates that the G150 fixed cycle has previously been stored in memory 91. G code expander 90 is then enabled so that operation of block processor 36 is redirected to the G150 fixed cycle available from memory 91.

Figure 4:
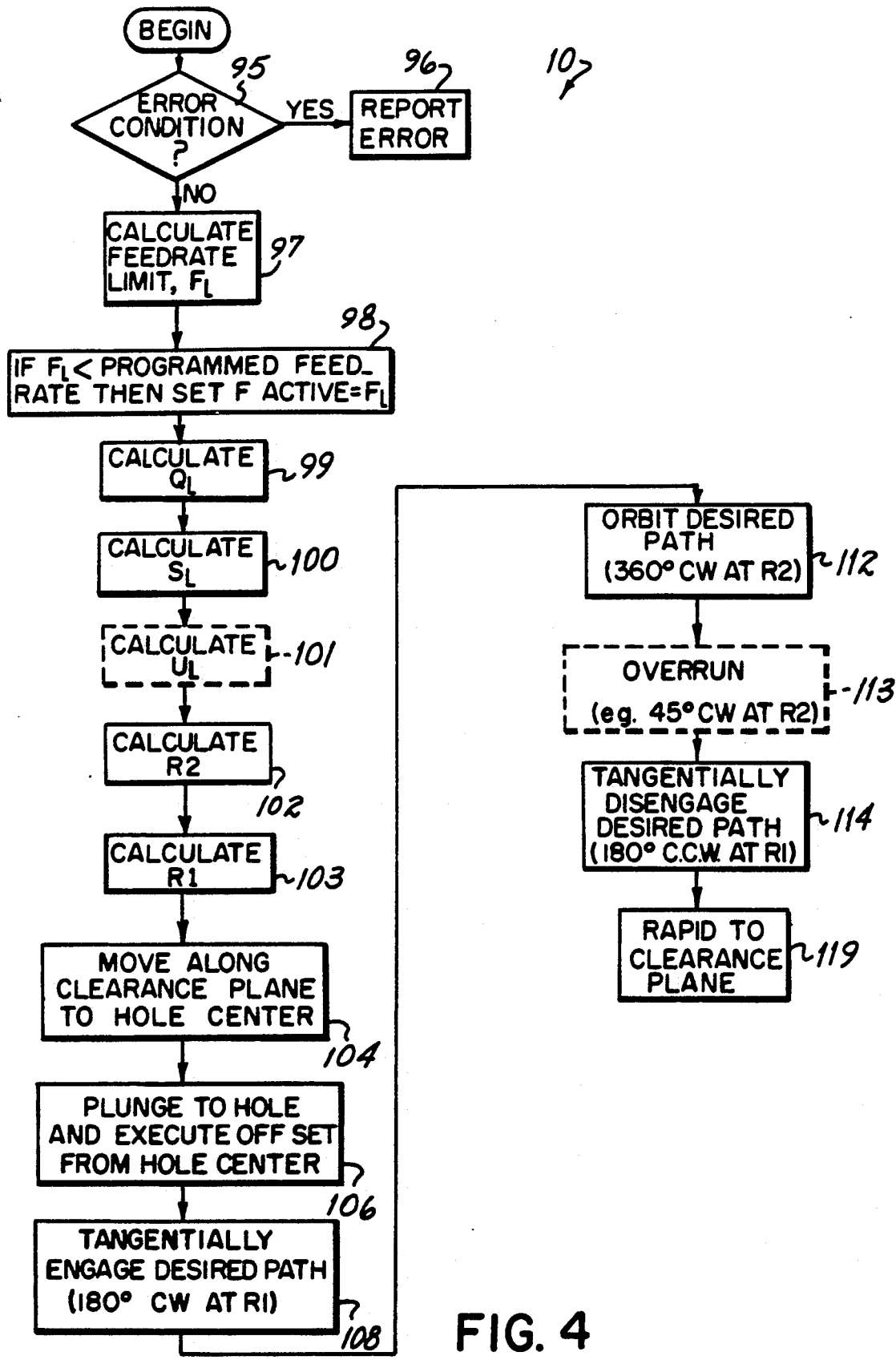
FIG. 4 is a simplified software flowchart of a fixed cycle for carrying out the operations of FIG. in accordance with the invention.

Upon being invoked, the fixed cycle of FIG. 4 begins by checking 95 and reporting 96 various error conditions such as failure of the part program to specify various parameters required to carry out the fixed cycle. Provided no error conditions are detected, the program preferably continues by calculating and storing 97 a feedrate limit, $F_L$. Preferably, this calculation is carried out substantially in accordance with EQUATION 6. At 98, the feedrate limit, $F_L$, is then compared with the programmed feedrate, and if $F_L$ is less than programmed feedrate F, F the feedrate to be executed, $F_{active}$, is set equal to $F_L$. Otherwise, $F_{active}$ equals the programmed feedrate, F. This allows machining operations to be carried out at as rapid a feedrate as the part programmer has specified unless the programmed feedrate can be expected to result in an unacceptably large path radius error. In that event, the feedrate is reduced just enough to guarantee acceptable path radius accuracy.

Once $F_{active}$ has been determined, the program then calculates and stores both QL at step 99 and $S_L$ at step 100 substantially in accordance with EQUATIONS 7 and 8 respectively. Optionally, where even more accurate path correction or the ability to program an even higher feedrate, F is desired, the program calculates and stores $U_L$ at step 101 substantially in accordance with EQUATION 9 and stores it in an appropriate temporary register in memory 93. It should be noted that the fixed cycle subroutine set forth in Appendix I does not calculate or utilize $U_L$ but, as the simplified flowchart of FIG. 4 indicates, $U_L$ may readily be included in applications requiring even greater speed or accuracy. The input data and temporary registers employed in the foregoing calculations are set forth in detail in Appendix I. The temporary registers T82 through T99 referred to there are included within the bank of temporary registers $T_{1-99}$, 93 shown in FIG. 2A. Execution of the fixed cycle of FIG. 4 continues according to the present invention by calculating and storing at step 102 corrected radius data, R2 substantially in accordance with:

$$R2 = R + Q_L - i\, S_L. \qquad \text{EQUATION 11}$$

Optionally, where even greater accuracy or a higher feedrate is desired, R2 may be determined utilizing optional term $U_L$ substantially in accordance with:

$$R2 = R + Q_L - S_L + U_L. \qquad \text{EQUATION 10}$$

Next, the program generates tangent entry and exit data preferably by calculating and storing at step 103 a path radius R1 where:

$$R1 = R/2 + 2Q_L - 2S_L. \qquad \text{EQUATION 12}$$

In EQUATIONS 7, 8, 9, 10, 11 and 12, the subscript "L" merely designates that the feedrate used to determine $Q_L$, $S_L$ and optional $U_L$ is an active feedrate, $F_{active}$, which may comprise either the desired feedrate specified in the part program or a feedrate limit, $F_L$. Of course, where feedrate limiting is not used, EQUATIONS 5, 1, 2, 3 and 4 which are based on the programmed feedrate, F, only may be substituted for EQUATIONS 11, 10, 7, 8 and 9, respectively. Likewise, EQUATION 12 may be replaced by:

$$R1 = R/2 + 2Q - 2S \qquad \text{EQUATION 12}$$

where Q and S are determined using EQUATIONS 2 and 3, respectively. Having completed the above calculations, controller 20 generates position command data 52 and 53 to be received by servo 69 to generate a sequence of predetermined moves. These moves can be more readily understood with additional reference now to FIG. 5.

Figure 5:
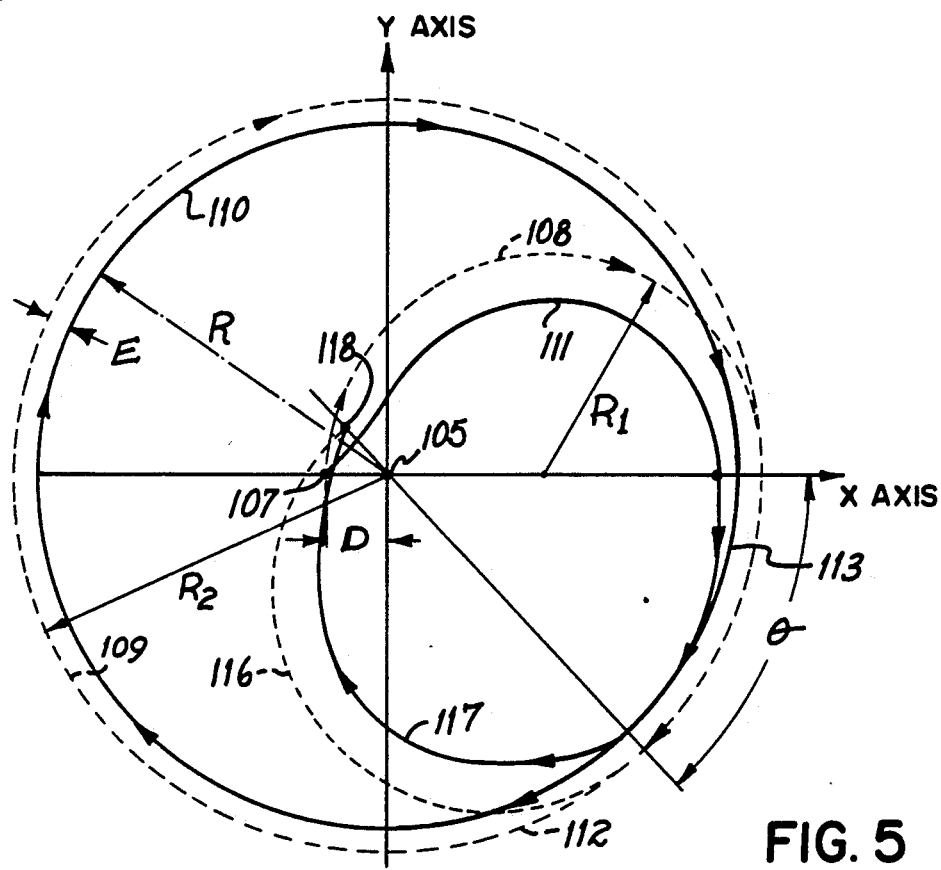
FIG. 5 is an operational diagram illustrating path radius correction according to the present invention particularly as applied to machining holes using a fixed cycle.

In FIG. 5, the moves commanded by the fixed cycle are represented by dotted lines while the actual path of relative movement between tool 12 and workpiece W in the X-Y plane resulting from such commands are illustrated in solid lines. In a first move 104 (referred to in FIG. 4 but not shown in FIG. 5), tool 12 is moved from its present location along a clearance plane to X and Y coordinates corresponding to a location spaced in the Z direction from the center point 105 of a hole to be machined In a second move 106 (also not shown in FIG. 5), tool 12 is fed parallel to Z axis to position tool 12 interiorly of a bore previously formed at said coordinates, said bore having a radius which is smaller than that of the hole to be machined. For a reason to be explained shortly, while moving in the Z direction from the clearance plane to the interior of the bore, the center of tool 12 is simultaneously offset along the X axis to an offset location 107 spaced a distance, D, from hole center 105 where D, is a given by:

$$D = ABS \qquad \text{EQUATION 13}$$

where R1 is determined substantially in accordance with EQUATION 12 above. R1 represents the commanded radius of a 180 degree clockwise circular arcuate move 108 which substantially tangentially engages a commanded circular path 109 of radius R2. When EQUATIONS 10 or 11 are solved using realistic values of desired radius, position loop gain, velocity loop integral time and feedrate, the movement between tool 12 and workpiece W carried out in response to a command to execute a circle of radius R2 will ordinarily result in an actual circle 110 of radius R which is smaller than commanded radius R2 by an amount, E, approximating the anticipated path radius error, E where:

$$E = R2 - R. \qquad \text{EQUATION 14}$$

Because commanded arc 108 is about one half the radius of commanded circle 109, the command to execute arc 108 will result in an actual path 111 whose radius differs from R1 by an amount somewhat greater than E. Offset D ensures that commanded arc 108 will substantially tangentially engage path 109. As a result, actual path 111 will substantially tangentially engage the machining locus of path 109.

As tool 12 moves from offset location 107 along movement path 111, it is accelerated to feedrate $F_{active}$ so that by the time tool 12 engages path 110, tool 12 is traveling at $F_{active}$ substantially tangentially to path 110 so that no abrupt accelerations or decelerations along either the X or Y axis are required in order to commence orbiting path in the manner now to be described.

Upon completion of tangential engagement move 108, the fixed cycle commands execution at feedrate, $F_{active}$, of a clockwise 360 degree orbital move 112 at radius R2 determined in accordance with EQUATION 11. As noted above, if greater accuracy or speed is desired, EQUATION 10 could be used in place of EQUATION 11 and, if feedrate limiting is not needed or desired, R2 could be determined using EQUATIONS 1 or 5. Because R2 differs from R by the anticipated path radius error E, orbital command 112 results in the execution of a substantially circular path 110 having an actual radius closely corresponding to the desired radius R specified in the G150 block in the part program thereby effectively correcting for such path radius errors. This permits greater path accuracy than prior art systems operating at comparable orbital feedrates or facilitates execution of orbit 112 at a significantly higher feedrate than would otherwise be required to obtain comparable path accuracy.

Upon returning to the vicinity of the X axis at the completion of orbit 112, the fixed cycle preferably commands execution of an overrun move 113 wherein tool 12 continues to orbit without interruption at commanded radius R2 (actual radius R) for an angular increment, $\theta$, which may suitably comprise about 45 degrees. Move 113 facilitates the removal of any significant surface discontinuities which may have been formed in the region where tool 12 first engaged workpiece W upon commencement of orbital move 112 around path 109. When overrun move 113 is completed, tool 12 is preferably moved, without interruption of its motion to substantially tangentially disengage path 109. This is conveniently accomplished by commanding execution of a 180 degree counterclockwise circular arc 116 also at commanded radius R1. In response to such command, tool 12 moves along an actual path 117 to return to an end point 118 located at a location interiorly of the milled hole wherein tool 12 is clear of the inside surface of the hole. As move 117 is carried out, tool 12 is preferably decelerated to avoid abrupt changes in acceleration or deceleration along either the X or Y axis. This helps to avoid blemishes in the surface of workpiece W which might otherwise be induced by reaction forces resulting from such abrupt accelerations or decelerations.

From end point 118, tool 12 is preferably withdrawn in a direction parallel to the Z axis from the interior of the milled hole to a clearance plane in a withdrawal move 119 (not shown in FIG. 5) to complete the fixed cycle. Controller 20 then disables G code expander 90 so that execution is then redirected to the part program which may contain one or more subsequent G150 program instruction blocks to be executed in a similar manner as that just described. Because tool 12 substantially tangentially engages orbit 112, subsequent holes can be machined using the same tool 12 even if those holes are of a substantially different size. In this way, the invention facilitates machining a plurality of holes of different diameters using a common tool 12. Because the need for tool changes to accommodate different sized holes is reduced, machining time and therefore the cost of machining operations is also reduced.

The fixed cycle described above may be readily adapted to carry out rapid and accurate threading of bores previously formed in workpiece W. To do so, tool 12 is selected to be a non-helical threading tool of the general type illustrated in FIGS. 6A, 6B and 6C. Also, the fixed cycle of FIG. 4 is altered to include the step of moving tool 12 along the Z axis parallel to the center of the bore at the same time orbiting move 112 is being carried out. The rate of movement of tool 12 parallel to the Z axis is selected in accordance with the orbital feedrate, $F_{active}$ to form threads of a desired pitch. As can be appreciated, this aspect of the invention facilitates accurate and rapid threading of holes of a variety of diameters and/or thread pitches using a common threading tool thereby decreasing the frequency at which tool changes are required.

Path correction according to the present invention assumes that system 10 is linear and that any sampling delays, $T_s$, i.e. the time delay between measurement of the position of a machine member, such as member 13, along its axis of travel and the execution of a velocity command based on that measurement, are small. Preferably, $T_s$ is much less than $1/150\, K_v$. Path correction according to the present invention further requires that the position loop gain, $K_v$ of the X axis stage of servo 69 be substantially matched to the position loop gain, $K_v$, of the Y axis. Further, the velocity loop integral time, $T_i$, for the X axis should be substantially matched to the velocity loop integral time, $T_i$, for the Y axis. Thus, the value of $K_v$ used by controller 20 to solve EQUATIONS 2 and 3 or 7 and 8 represents a single value matched in the X and Y axis stages of servo 69. Likewise, the velocity loop integral time, $T_i$, used by controller 20 to solve EQUATIONS 3 and 4 or 8 and 9 represents a single value matched in the X and Y axis stages of servo 69. These values are determined upon setup of system 10 and are entered for storage in memory 92 via keyboard 26b. As noted previously, these stored values are available to G code expander 90 for use in carrying out the path correction fixed cycles described above.

On modern CNC controls, it is a straightforward matter to use known techniques for optimizing transient response in order to determine and set proper, matched values for $K_v$ for the X and Y position loop stages of servo 69. Once established, this value of $K_v$ is readily stored in memory 92.

It is also possible to use standard techniques for optimizing transient response to separately set $T_i$ for the X axis and $T_i$ for the Y axis to appropriate nominal values. However, due to tolerance variations associated with certain analog components within each respective velocity loop stage of servo 69, it has not previously been possible to set $T_i$ to a single apparent value closely matched in the X and Y axes and to determine that $T_i$ value with the precision desired to implement path radius correction according to the present invention. A further aspect of the present invention which provides for doing so will now be explained with additional reference now to FIG. 7.

Once the position loop gain, $K_v$, for both the X and Y axes have been set to an appropriately matched known value and $T_i$ has been initially set as closely as possible to a single appropriate value for both the X and Y velocity loop stages of servo 69, the following steps are carried out.

A workpiece of free cutting aluminum or other suitable material having a predrilled reference/mounting hole is secured to machine 11. A tool such as a milling cutter 0.5000 inches in diameter is chucked to spindle 16 and a part program commanding cutting of a 1.000 inch circle at a relatively high feedrate, F (i.e. one hundred inches per minute) at a suitable spindle speed is executed. While the circle may be either an inside or an outside circle, it is preferable to make the cut on the outside to facilitate measurement of the resulting part which will have a nominal diameter of about 1.5 inches. Next, using a roundness measuring instrument such as a Talyrond, an enlarged graphical representation of the profile of the machined workpiece is made. If $T_i$ is not suitably matched in X and Y, machined part will exhibit a noncircular profile such as the skewed, ellipsoid-like path 121 of FIG. 7. In such event, the $T_i$ value for either the X or Y velocity loop stage, but not both, should be adjusted incrementally and the above process repeated until a substantially circular profile as represented by path 122 of FIG. 7 is obtained.

In lieu of actually cutting a workpiece and measuring its profile mechanically, system 10 can readily be programmed to form an electronic representation of the machining path by sampling and plotting in polar coordinate form on CRT 26b position feedback data from resolvers $R_x$ and $R_y$. Once a substantially circular profile as represented by plot 122 is obtained, the apparent values of $T_i$ are suitably matched for both the X and Y axes. For small mismatches in $T_i$, it has also been determined that instead of incrementally adjusting $T_i$ it is often possible to incrementally adjust the value of $K_v$ in either X or Y until a circular plot such as plot 122 is obtained provided that the adjusted value of $K_v$ in either X or Y does not differ by more than about five percent from its original matched value.

In order to determine the numerical value of $T_i$ as set using the above procedure, the path radius error, E, between the commanded radius and plot 122 is measured. Then, $T_i$ may be determined substantially in accordance with the expression:

$$T_i = K_v/2 - (E*K_v*R/F^{\frac{1}{2}})  \quad \text{EQUATION 15}$$

where EQUATION 15 is EQUATION 5 solved for $T_i$. Of course, where feedrate limiting is employed, $F_{active}$ should be substituted for F in EQUATION 15 in accordance with EQUATION 11. Thus determined, $T_i$ is then entered via keyboard 26b for storage within memory 92 for access by the fixed cycle carrying out path radius correction.

The path correction systems described above are highly advantageous in a great number of machining applications, particularly when the hole to be threaded or otherwise machined is of a relatively small diameter and/or it is desired to machine at a relatively rapid feedrate. However, it is to be recognized that in a great number of other machining applications such as where the hole diameter is relatively large and/or the feedrate must b limited to a relatively low rate to accommodate particular machining conditions (such as when cutting very hard materials), other aspects of the invention may still be employed to great advantage as will now be discussed.

With simultaneous reference to FIG. 8 and FIG. 9, a second fixed cycle according to the present invention begins by checking for error conditions at 124 and generating appropriate reports at 125 in response to any error conditions detected. If no such error conditions are detected, the fixed cycle optionally calculates a feedrate limit, $F_L$ at 126 preferably substantially in accordance with EQUATION 6 and then at 127 sets the feedrate to be executed, Factive, equal to $F_L$ if $F_L$ is less than the programmed feedrate, F. Otherwise, $F_{active}$ is set equal to the programmed feedrate F. As emphasized by the dotted boxes in FIG. 9, steps 126 and 127 are optional but advantageously serve to limit path radius errors in the event the programmed feedrate, F, is unsuitably large in relation to the diameter of the hole to be machined. If the above steps are not used, the active feedrate, $F_{active}$, equals the programmed feedrate, F, under all conditions.

In a first move 128, tool 12 is moved along a clearance plane parallel to the X-Y plane to X-Y coordinates corresponding to the center 129 of the hole to be machined from a bore located there. In a second move 130, tool 12 is then fed in a direction parallel to the Z axis interiorly of the bore to center point 129. In a third move 131, tool 12 is moved to substantially tangentially engage a circular path 132 whose radius, R, determines the diameter of the hole to be machined. FIG. 5 illustrates the path traversed by the center of tool 12 so the actual radius of the hole to be machined will normally be larger than R by one tool radius. Preferably, move 131 is carried out by commanding execution of a clockwise circular arc of radius R/2, where R is the radius of path 132. As move 130 is carried out, tool 12 is accelerated relative workpiece W so that by the time tool 12 engages path 131, tool 12 is substantially fully accelerated to $F_{active}$ thereby avoiding any sudden accelerations or decelerations along the X or Y axis and reducing the risk of surface blemishes which might otherwise be caused by them.

Upon completion of tangential engagement move 131, the fixed cycle, at 133, commands commencement, without interruption of motion, of a 360 degree clockwise orbit of radius R around path 131 to machine the hole. Preferably, an optional overrun move 134 is then performed. Move 134 causes tool 12 to overrun the angular location at which it first began its orbit around path 132 in order to remove any surface discontinuities which might have been formed on the workpiece in that vicinity. Tool 12 continues to overrun a portion of path 132 for an arbitrary angular increment such as 45 degrees. Upon completion of orbit 133 (or overrun move 134, if the latter is included), tool 12 is moved at 135 without interruption of motion to substantially tangentially disengage path 131 thereby avoiding sudden accelerations or decelerations along the X or Y axis while tool 12 is in contact with workpiece W. Preferably, such disengagement is carried out by commanding execution of a 180 degree counterclockwise circular arc 135a of radius R/2 to return tool 12 to center point 129. Finally, in a withdrawal move 136, tool 12 is withdrawn from the hole, preferably at a rapid rate, along the Z axis to a clearance plane. From that location subsequent moves, including moves defined by subsequent fixed cycles, can be commenced in accordance with the part program.

What is claimed is:

APPENDIX I

G150 fixed cycle G11E[P33]=OL2 ;SKIP IF G90 SELECTED G103E16384+9595 ;REPORT NOT G90 ERROR Q2G11E[P30]=OL5 ;SKIP IF G17 SELECTED G103E16384+9494 ;REPORT NOT G17 ERROR Q5G11E[P34]=1L10 ;SKIP IF FPM MODE G103E163S4+9191 ;REPORT NOT FPM ERROR Q10G11E[T88]=1L20 ;MODAL F WORD ALREADY
:PICKED UP [MI10]OR MODAL G11E[p6]=1L30 ;SK1p IF F pROGRAMMED G10=[TS6]V[M110) ;PICK UP FEEDRATE FROM [MI10]GIIL40 Q20G11E[P6]=OL50 ;SKIP IF F NOT PROGRAMMED Q30G10=[T86]V[V6];SAVE PROGRAMMED F VALUE Q40GIO=[T88]VI ;SET F MODAL VALUE SAVED Q50G11E[P18]=OL6O ;SKIP IF RADIUS (R) NOT PROGRAMMED G10=[T92]V[V18]-([M164]/2) ;SAVE PROGRAMMED RADIUS (R)
;ADJUSTED BY NOMINAL TOOL RADIUS G10=[T87]VI ;SET R ESTABLISHED G11L70 Q60G11E[T87]=1L70 ;SK1p IF RADIUS ESTABLISHED G103E16384+9292 ;REpORT NO R pROGRAMMED ERROR Q70G11E[pl6-]=OL80 ;SKlp IF pLANE (R) NOT PROGRAMMED G10=[T91]V[Vl6];SAVE PROGRAMMED PLANE (P) G10=[T90]VI ;SET P ESTABLISHED GIIL90 Q80GIIE[T90]=1L90 ;SKIP IF PLANE ESTABLISHED G103E16384+9393 ;REPORT NO P PROGRAMMED ERROR Q90G11E[P24]=OL100 ;SKIP IF X NOT PROGRAMMED G10=[T82]V[V24];SAVE PROGRAMMED X GIO=[T83]V1 ;SET X ESTABLISHED G11LI10 Q100G11E[T83]=1L110 ;SKIP IF X ESTABLISHED G103E16384+9696 ;REPORT NO X PROGRAMMED ERROR Q110G11E[p25-]=OL120 ;SKlp IF Y NOT pROGRAMMED G10=[T84]V[V25];SAVE PROGRAMMED Y G10=[T85]VI ;SET Y ESTABLISHED Q120G11E[T85]=1L130 ;SKIP IF Y ESTABLISHED G103E16384+9797 ;REPORT NO Y PROGRAMMED ERROR Q130G11E[P26-]=OL140 ;SKIP IF Z NOT PROGRAMMED G10=[T89]V[V26];SAVE PROGRAMMED Z G10=[T93]V1 ;SET Z ESTABLISHED G11L150 Q140G11E[T93]=1L150 G103E16384+9898 ;REpORT NO Z pROGRAMMED ERROR Q150G10=[T95]V[AGP,I,G];SAVE GAIN VALUE G10=[T94]V(100*[T95]*[SQR([T92])]) ;CALCULATE F ERROR LIMITED G11E[T94]<[T86]L160 ;SKIP IF F MODAL >=LIMITED F G10=[T94]V[T86];SET F ACTIVE TO F MODAL Q160G10=[T96]V((((5*[T94]*[T94])/([T95]*[T9-5]))/[T92])/10000000)

;CALCULATE Q G10=[T97]V(-0.03333*[T96]*[T95]*[CYP,80,V])
;CALCULATE S G1O=[T98]V([T92]+[T96]-[T97]) ;CALCULATE R2 G10=[T99]V(O.5*[T92]+2*[T96]-2*[T97])
;CALCULATE R1 G48G90G0X([T82]-(2*[T99]-[T98]))Y[T84]Z[T91]D[V4]H[V8]F[T86]M[V13]S-[V19]T[V20]
;MOVE TO CENTER OF HOLE W/OFFSET G91GIZ(-[ABS([T89])])-[ABS(-[CYP,39+[P36],V])]
;MOVE TO Z DEPTH ADJUSTED BY
;THE GAUGE HEIGHT G42G91X0.0001 ;BRING IN CDC G90G02X([T82]+[T98])Y[T84]P[T99]F[T94]
;MOVE 180 CIRCLE RADIUS R1 G02X([T82]-[T98])I[T82]J[T84];MOVE 180 CIRCLE RADIUS R2 G02X([T82]+[T98]) ;MOVE 180 CIRCLE RADIUS R2 G02X([T82]+(0.7071*[T98]))Y([T84]-(0.7071*[T98]))P[T98]
;MOVE 45 CIRCLE RADIUS R2 GO2X([T82]-(2*[T99]-[T98]))Y[T84]p[T99]
;MAKE 180 CIRCLE RADIUS R1 G0G40X[T8-2]Y[T84]Z[T91]+[ABS(-[CYP,39+[P36],V])]F[T86]M[V13]S[V19]
;RAPID TO CLEARANCE PLANE
:ADJUSTED BY GAUGE HEIGHT Input Data: [V06]Feedrate [V16]Radius [V18]Clearance plane [V24]-[V26]X, Y and Z WORDS [CYP,80,V]Ti integral time [CYP,39,V]Gauge height inch [CYP,40,V]Gauge height metric Temporary Registers: [T82]Programmed X [T83]X established flag [T84]Programmed Y [T85]Y established flag [T86]Programmed F [T87]P established flag [T88]F established flag [T89]Programmed Z [T90]R established flag [T91]Saved R plane [T92]Programmed radius [T93]Z established flag [T94]Error limited F [T95]Gain (Kv) [T96]Q value [T97]S value [T98]R2 value [T99]R1 value 1. A method of correcting path radius errors in a computer numerically controlled system of the type adapted to receive program instructions defining a desired path of relative movement to be effected between a workpiece and a tool by motion of machine members along at least two orthogonal linear axes at a feedrate, (F) under control of a servo which receives position commands based on said instructions, said servo having at least one of, a position loop gain, ($K_v$) and a velocity loop integral time, ($T_i$), said path including a curved portion to be executed by effecting coordinated linear movement along said axes, said method comprising the steps of:

(a) receiving an instruction defining a desired radius, (R) of said curved portion;

(b) generating corrected radius data, (R2) to compensate for servo following errors appearing as path radius errors along said curved portion of said path such that the difference between the desired radius, (R) and said corrected radius data, (R2) compensates for at least a portion of the path radius error that would otherwise be induced in the movement by the servo, and (c) generating the position commands in response to said corrected radius data whereby the actual relative movement between the workpiece and the tool more closely follows said curved portion of said desired path.

2. The method of claim 1 wherein said corrected radius data, (R2) is generated substantially in accordance with the expression:

$$R2 = R + Q - S$$

where:

$$Q = F^2/2R\, K_v^2, \text{ and}$$

$$S = 2Q\, T_i K_v.$$

3. The method of claim 1 wherein said corrected radius data, (R2) is generated substantially in accordance with the expression:

$$R2 = R + Q - S + U$$

where:

$$Q = F^2/2R\, K_v^2$$

$$S = 2Q\, T_i K_v, \text{ and}$$

$$U = Q(T_i F/R)^2.$$

4. The method of claim 1 further comprising the step of carrying out the steps of said method by means of a fixed cycle, the execution of which is invoked by a single, parameterized program instruction.

5. The method of claim 1 further comprising the step of adjusting the value of $T_i$ for at least one of said axes such that said servo will execute said relative movement along a curve substantially parallel to said curved portion of said path.

6. The method of claim 5 wherein said adjusting step includes the steps of:
 (a) using said system to run a first program commanding execution of a first circular path of a first commanded radius at a first commanded feedrate and centered at a given point to determine a first actual curve;
 (b) using said system to run a second program commanding execution at a second commanded feedrate of a second circular path of said first commanded radius centered at said point to determine a second actual path, second commanded feedrate differing from said first commanded feedrate, and
 (c) determining whether said first actual curve and said second actual paths lie substantially concentric with one another and, if not, adjusting the value of $T_i$ for at least one of said axes.

7. The method of claim 6 further comprising the steps of repeating steps (a), (b) and (c) until said first actual curve and said second actual curve lie substantially concentric with one another.

8. The method of claim 6 further comprising the steps of forming a graphical representation of said first and second actual curves and/or the difference, if any, between said first and second curves at angularly corresponding points.

9. The method of claim 8 wherein said graphical representation is formed using a roundness measuring instrument.

10. The method of claim 8 wherein said graphical representation is formed by electronically generating display data correlated to said first and second actual curves, respectively.

11. The method of claim 2 further comprising the step of determining said integral time factor, ($T_i$) of a servo in a computer numerically controlled system of the type adapted to receive program instruction specifying a desired curved path of relative movement to be effected between a workpiece and a tool by coordinated linear motion of machine members along at least two orthogonal axes at a feedrate, (F) under control of the servo in response to position commands based on said instructions, said servo having in addition to said integral time factor, ($T_i$) a position loop gain, ($K_v$), said method comprising the steps of:
 (a) setting the values of $K_4$ for each of said axes to equal, known values;
 (b) adjusting the value of $T_i$ for at least one of said axes such that said servo will execute said relative movement along a substantially time circular arc concentric with said desired curved path;
 (c) determining a path radius error, (e) due to said integral term, ($T_i$), and
 (d) determining the value of $T_i$ substantially in accordance with the expression:

tpi $T_i = K_v/2 = (E^*K_v^*R/F^{\frac{1}{4}})$ where:
 R represents the radius of said desired curved path.

12. A method of determining the integral time factor, ($T_i$) of a servo in a computer numerically controlled system of the type adapted to receive program instructions specifying a desired curved path of relative movement to be effected between a workpiece and a tool by coordinated linear motion of machine members along at least two orthogonal axes at a feedrate, (F) under control of the servo in response to position commands based on said instructions, said servo having in addition to said integral time factor, ($T_i$), a position loop gain, ($K_{vi}$), said method comprising the steps of:
 (a) setting he values of $K_v$ for each of said axes to equal, known values;
 (b) adjusting the value of $T_i$ for at least one of said axes such that said servo will execute said relative movement along a substantially true circular arc concentric with said desired curved path;
 (c) determining a path radius error, (E) due to said integral term, ($T_i$), and
 (d) determining the value of $T_i$ substantially in accordance with the expression:

$$T_i = K_v/2 - (E^*K_v^*R/VF^{\frac{1}{4}})$$

where:
 R represents the radius of said desired curved path.

13. A method of correcting path radius errors in a computer numerically controlled system of the type adapted to receive program instructions defining a desired path of relative movement between a workpiece and a tool to be effected by motion of machine members along at least two orthogonal linear axes at a desired feedrate, (F) under control of a servo which receives position commands based on said instruction, said path including a curved portion to be executed by effecting coordinated linear movement along said axes, said servo having at least one of, a position loop gain, ($K_v$) and a velocity loop integral time, ($T_i$), said method comprising the steps of:
 (a) receiving an instruction defining a desired radius, (R) of said curved portion;
 (b) determining a feedrate limit, ($F_L$);
 (c) generating corrected radius data, (R2) to compensate for servo following error along said curved portion, said corrected radius data (R2) being generated based on a limited feedrate, ($F_{active}$), whose magnitude does not significantly exceed said feedrate limit, ($F_L$), and (d) generating the position commands in responses to said corrected radius data whereby the actual relative movement between the workpiece and the tool more closely follows said curved portion of said desired path.

14. The method of claim 13 wherein said corrected radius data, (R2) is generated substantially in accordance with the expression:

$$R2 = R + Q_L - S_L$$

where:

$$Q_{al} = F_{active}^2 / 2R\, K_v^2, \text{ and}$$

$$S_L = 2Q_L T_i K_v.$$

15. The method of claim 13 wherein said corrected radius data, (R2) is generated substantially in accordance with the expression:

$$R2 = R + Q_L - S_L + U_L$$

where:

$$Q_L = F_{active}^2 / 2R\, K_v^2$$

$$S_L = 2Q_L T_i K_v, \text{ and}$$

$$U_L = Q_L (T_i F_{active}/R)^2.$$

16. The method of claim 13 wherein said limited feedrate, ($F_{active}$) is selected to substantially equal the lesser of:
 (a) said feedrate limit, ($F_L$), and
 (b) the desired feedrate, (F).

17. The method of claim 13 wherein said feedrate limit, ($F_L$) is determined substantially in accordance with the expression:

$$F_L = 0.10 K_v R^{\frac{1}{2}}.$$

18. A method of machining holes in a workpiece using a tool, said method comprising the steps of:
 (a) positioning the tool interiorly of a bore previously formed in the workpiece;
 (b) moving the tool to substantially tangentially engage a closed locus of points defining a desired path to be machined;
 (c) orbiting the tool at least 360 degrees around said locus to machine a hole of a desired size from said bore, and
 (d) moving the tool to substantially tangentially disengage said tool from substantial coincidence with said locus.

19. The method of claim 18 further comprising the step of accelerating said tool to a desired orbital feedrate as it is moved from the interior of bore into said tangential engagement.

20. The method of claim 18 further comprising the step of decelerating said tool from a desired orbital feedrate after said tool is moved to substantially tangentially disengage said locus.

21. The method of claim 18 further comprising the step of continuing said orbiting step beyond said 360 degrees prior to execution of said disengaging step to facilitate removal of any significant discontinuity in the machined surface of the workpiece.

22. The method of claim 18 wherein said closed locus of points is a circle.

23. The method of claim 18 further comprising the step of carrying out the steps of said method by means of a fixed cycle in a computer numerically controlled system, the execution of said fixed cycle being invoked by a single parameterized program instruction.

24. A method of machining holes in a workpiece with correction of path radius errors for use in a computer numerically controlled system of the type adapted to receive program instructions defining a desired path of relative movement to be effected by motion of machine members along at least two orthogonal linear axes between a workpiece and a tool at a feedrate, (F) under control of a servo which receives position commands based on said instructions, said path including a curved portion to be executed by effecting coordinated linear movement along said axes, said servo having at least one of, a position loop said method comprising the steps of:

(a) receiving data defining at least X and Y coordinates of an interior location of a hole to be machined, a desired feedrate, (F), and the radius, (R) of a desired path to be traversed by the tool in order to machine a hole of a given size;

(b) generating corrected radius data (R2) to compensate for servo following errors appearing as path radius errors along said curved portion of said path so that the difference between the desired radius, (R) and the corrected radius data, (R2) compensates for at least a portion of the path radius error that would otherwise be induced in the movement by the servo;

(c) generating tangential engagement data for defining a second path for moving said tool to substantially tangentially engage said desired path;

(d) generating tangential disengagement data for defining a third path for moving said tool to substantially tangentially disengage said desired path;

(e) moving said tool to a particular location interiorly of a bore in accordance with at least said coordinates;

(f) moving said tool in accordance with . said tangential engagement data along said second path into substantially tangential coincidence with said desired path;

(g) orbiting said tool at least about 360 degrees around said desired path in accordance with said corrected radius data to machine said hole to said given size, and (h) moving said tool in accordance with said tangential disengagement data along said third path to substantially tangentially disengage said tool from the surface of the workpiece.

25. The method of claim 24 wherein said corrected radius data, (R2) is generated substantially in accordance with the expression:

$$R2 = R + Q_L - S_L$$

where:

$$Q_L = F_{active}/2R\, K_v^2$$

$$S_L = 2Q_L T_i K_v, \text{ and}$$

$F_{active}$ is a limited feedrate which does not significantly exceed said desired feedrate, F.

26. The method of claim 25 wherein at least one of said tangential engagement data in said tangential disengagement data define an arc whose radius, R1 is determined substantially in accordance with the expression:

$$R1 = R/2 + 2Q_L - 2S_L.$$

27. The method of claim 24 wherein said corrected radius data, (R2) is generated substantially in accordance with the expression:

$$R2 = R + Q_L - S_L + U_L$$

where:

$$Q_L = F_{active}/2R\, K_v^2$$

$$S_L = 2Q_L T_i K_v$$

$$U_L = Q_L\, (T_i F/R)^2, \text{ and}$$

$F_{active}$ is a limited feedrate which does not significantly exceed said desired feedrate, F.

28. The method of claim 27 wherein said coordinates define the center of the hole and wherein in step (e) of said method, said particular interior location is offset from said center by a distance, (D) determined substantially in accordance with the expression:

$$D = ABS$$
$$D = ABS\, [R2\text{-}R1]$$

wherein R1 is determined substantially in accordance with the expression:

$$R1 = R/2 + 2Q_L - 2S_L.$$

29. The method of claim 24 wherein at least said orbiting step is substantially carried out at substantially the desired feedrate, (F).

30. The method of claim 24 wherein at least said orbiting step is substantially carried out at a limited feedrate, ($F_{active}$) which does not substantially exceed the desired feedrate, (F).

31. The method of claim 30 wherein said limited feedrate, ($F_{active}$) is selected to substantially equal the lesser of:
 (a) a feedrate limit, ($F_L$), and
 (b) the desired feedrate, (F).

32. The method of claim 31 wherein said feedrate limit, ($F_L$) is determined substantially in accordance with the expression:

$$F_L = 0.10 K_v R^{\frac{1}{2}}.$$

33. The method of claim 24 further comprising the steps of carrying out the steps of said method by means of a fixed cycle, the execution of which is invoked by a single, parameterized program instruction.

34. The method of claim 24 further comprising the steps of repeating the steps of said method to machine a second hole and wherein the tool used to machine both said hole and said second hole is the same tool, said hole and said second hole being of substantially different sizes whereby a plurality of holes of different sizes may be machined using a tool of a given size.

35. A method of machining holes in a workpiece using a non-helical threading tool, said method comprising the steps of:
 (a) positioning the tool interiorly of a bore previously formed in the workpiece;
 (b) moving the tool into substantially tangential coincidence with a locus of points defining a desired circular path to be machined;
 (c) orbiting the tool around said locus while simultaneously moving the tool in a direction parallel to the longitudinal axis of said bore at a rate appropriate to form threads of a desired pitch int he hole, and
 (d) moving the tool to substantially tangentially disengage said tool from the surface of the workpiece.

36. A method of forming threaded holes in a workpiece with correction of path radius errors for use in a computer numerically controlled system of the type adapted to receive program instructions defining a desired path of relative movement between a workpiece and a rotating non-helical threading tool to be effected by motion of machine members along at least three orthogonal axes at a feedrate, (F) under control of a servo which receives position commands based on said instructions, said path including a curved portion to be executed by carrying out coordinated linear movement along at least two of said axes, said servo having at least one of, a position loop gain, ($K_v$) and an integral time, ($T_i$), said method comprising the steps of:
 (a) receiving data defining at least X and Y interior coordinates of a hole to be threaded, a desired feedrate, (F), and the radius, (R) of a desired path to be traversed by the tool in order to thread the hole;
 (b) generating corrected radius data (R2) for driving said servo to compensate for servo following errors appearing as path radius errors along said curved portion of said path so that the difference between the desired radius, (R) and the corrected radius data, (R2) compensates for at least a portion of the path radius error that would otherwise be induced in the movement by the servo;
 (c) generating tangential engagement data for defining a second path for moving said tool to substantially tangentially engage with said desired path;
 (d) generating tangential disengagement data for defining a third path for moving said tool to substantially tangentially disengage said desired path;
 (e) moving said tool to a location interiorly of the hole in accordance with at least said X and Y coordinates;
 (f) moving said tool in accordance with said tangential engagement along said second path into substantially tangential coincidence with said desired path;
 (g) orbiting the tool around said desired path in accordance with said corrected radius data while simultaneously moving the tool in a direction parallel to the longitudinal axis of the hole at a rate appropriate to form threads of a desired pitch in the hole, and
 (h) moving said tool in accordance with said tangential disengagement data along said third path to substantially tangentially disengage said tool from the surface of the workpiece.

37. The method of claim 36 wherein at least said orbiting step is substantially carried out at substantially the desired feedrate, (F).

38. The method of claim 36 wherein at least said orbiting step is substantially carried out at a limited feedrate, ($F_{active}$) which does not substantially exceed the desired feedrate, (F).

39. The method of claim 38 wherein said limited feedrate, ($F_{active}$) is selected to substantially equal the lesser of:
   (a) a feedrate limit, ($F_L$), and
   (b) the desired feedrate, (F).

40. The method of claim 39 wherein said corrected radius data, (R2) is generated substantially in accordance with the expression:

$$R2 = R + Q - S$$

where:

$$Q = F^2/2R\ K_v^2,\ \text{and}$$

$$S = 2Q\ T_i K_v.$$

41. The method of claim 39 wherein said corrected radius data, (R2) is generated substantially in accordance with the expression:

$$R2 = R + Q - S + U$$

where:

$$Q = F^2/2R\ K_v^2$$

$$S = 2Q\ T_i K_v,\ \text{and}$$

$$U = Q(T_i F/R)^2.$$

42. The method of claim 39 wherein said feedrate limit, ($F_L$) is determined substantially in accordance with the expression:

$$F_L = 0.10\ K_v R^{\frac{1}{2}}.$$

43. The method of claim 36 further comprising the step of repeating the steps of said method to thread a second hole and wherein the tool used to thread both said hole and said second hole is the same tool, said hole and said second hole being of substantially different diameter whereby a plurality of holes of different diameter may be threaded using a tool of a given size.

44. The method of claim 36 further comprising the steps of carrying out the steps of said method by means of a fixed cycle, the execution of which is invoked by a single, parameterized program instruction.

45. An apparatus for correcting path radius errors in a computer numerically controlled system of the type adapted to receive program instructions defining a desired path of relative movement to be effected by motion of machine members along at least two orthogonal linear axes between a workpiece and a tool at a feedrate, (F) under control of a servo which receives position commands based on said instructions, said path including a curved portion to be executed by effecting coordinated linear movement along said axes, said servo having at least one of, a position loop gain, ($K_v$) and a velocity loop integral time, ($T_i$), said apparatus comprising:
   (a) input means for receiving program instructions including an instruction defining a desired radius, (R) of said curved portion, and
   (b) compensation means connected to said input means for generating corrected radius data, (R2) to compensate for servo following errors appearing as path radius errors along said curved portion of said path such that the difference between the desired radius, (R) and said corrected radius data, (R2) compensates for at least a portion of the path radius error that would otherwise be induced in the movement by the servo, said compensation means also being connected to said servo so that said servo receives position commands correlated to said corrected radius data whereby the actual relative movement between the workpiece and the tool more closely follows said curved portion of said desired path.

46. The apparatus of claim 45 wherein said corrected radius data, (R2) is generated substantially in accordance with the expression:

$$R2 = R + Q - S$$

where:

$$Q = F^2/2R\ K_v^2,\ \text{and}$$

$$S = 2Q\ T_i K_v.$$

47. The apparatus of claim 45 wherein said corrected radius data, (R2) is generated substantially in accordance with the expression:

$$R2 = R + Q - S + U$$

where:

$$Q = F^2/2R\ K_v^2$$

$$S = 2Q\ T_i K_v,\ \text{and}$$

$$U = Q(T_i F/R)^2.$$

48. The apparatus of claim 45 further comprising means for carrying out said compensation by means of a fixed cycle, the execution of which system is invoked by a single, parameterized program instruction.

49. An apparatus for correcting path radius errors in a computer numerically controlled system of the type adapted to receive program instructions defining a desired path of relative movement to be effected between a workpiece and a tool by motion of machine members along at least two orthogonal linear axes at a desired feedrate, (F) under control of a servo which receives position commands based on said instructions, said path including a curved portion to be executed by effecting coordinated linear movement along said axes, said servo having at least one of, a position loop gain, ($K_v$) and a velocity loop integral time, ($T_i$), said apparatus comprising:
   (a) input means for receiving an instruction defining a desired radius, (R) of said curved portion;
   (b) feedrate limiting means for determining a feedrate limit, ($F_L$), and
   (c) compensation means connected to said input means and said feedrate limiting means for generating corrected radius data, (R2) using a limited feedrate, ($F_{active}$), whose magnitude does not significantly exceed said feedrate limit, ($F_L$), said compensation means also being connected to said servo so that said servo receives position commands correlated to said corrected radius data whereby the actual relative movement between the workpiece and the tool more closely follows said curved portion of said desired path.

50. The apparatus of claim 49 wherein said corrected radius data, (R2) is generated substantially in accordance with the expression:

$$R2 = R + Q - S$$

where:

$$Q = F_{active}^2/2R\ K_v^2,\ \text{and}$$

$$S = 2Q\ T_i K_v$$

51. The apparatus of claim 49 wherein said corrected radius data, (R2) is generated substantially in accordance with the expression:

$$R2 = R + Q - S + U$$

where:

$$Q = F_{active}^2/2R\ K_v^2$$

$$S = 2Q\ T_i K_v,\ \text{and}$$

$$U = Q(T_i F_{active}/R)^2.$$

52. An apparatus for machining holes in a workpiece using a tool, said apparatus comprising:
 (a) means for positioning the tool interiorly of a bore previously formed int he workpiece;
 (b) means for moving the tool to substantially tangentially engage a closed locus of points surrounding said bore, said locus defining a desired path to be machined;
 (c) means for orbiting the tool at least 360 degrees around said locus to machine a hole of a desired size from said bore, and
 (d) means for moving the tool to substantially tangentially disengage said tool from said locus.

53. The apparatus of claim 52 further comprising means for continuing said orbiting step beyond said 360 degrees prior to execution of said disengaging step to facilitate removal of any significant discontinuity in the machined surface of the workpiece.

54. The apparatus of claim 52 further comprising means for carrying out said positioning, engaging, orbiting and disengaging by means of a fixed cycle, the execution of which is invoked by a single parameterized program instruction.

55. An apparatus for machining holes in a workpiece with correction of path radius errors for use in a computer numerically controlled system of the type adapted to receive program instructions defining a desired path of relative movement between a workpiece and a tool to be effected by motion of machine members along at least two orthogonal linear axes at a feedrate, (F) under control of a servo which receives position commands based on said instructions, said path including a curved portion to be executed by effecting coordinated linear movement along said axes, said servo having at least one of, a position loop gain, ($K_v$) and a velocity loop integral time, ($T_i$), said apparatus comprising:
 (a) input means for receiving data defining an interior location of a bore, a desired feedrate, (F), and the radius, (R) of a desired path to be traversed by the tool in order to machine said bore to a hole of a given size;
 (b) processor means means for:
  (i) generating corrected radius data (R2) to compensate for servo following errors appearing as path radius errors along said curved portion of said path so that the difference between the desired radius, (R) and the corrected radius data, (R2) compensates for at least a portion of the path radius error that would otherwise be induced in the movement by the servo;
  (ii) generating tangential engagement data for defining a second path for moving said tool to substantially tangentially engage with said desired path;
  (iii) generating tangential disengagement data for defining a third path for moving said tool to substantially tangentially disengage said desired path, and
 (c) means connected to said processor means for sequentially:
  (i) moving said tool interiorly of said bore in accordance with said coordinates;
  (ii) moving said tool in accordance with said tangential engagement data along said second path into substantially tangential coincidence with said desired path;
  (iii) orbiting said tool at least about 360 degrees around said desired path in accordance with said corrected radius data to machine said hole to said given size, and
  (iv) moving said tool in accordance with said tangential disengagement data along said third path to substantially tangentially disengage said tool from the surface of the workpiece.

56. The apparatus of claim 55 wherein said corrected radius data, (R2) is generated substantially in accordance with the expression:

$$R2 = R + Q - S + U$$

where:

$$Q = F^2/2R\ K_v^2$$

$$S = 2Q\ T_i K_v,\ \text{and}$$

$$U = Q(T_i F/R)^2.$$

57. The apparatus of claim 55 further comprising means for carrying out the said generation of said corrected radius data by means of a fixed cycle, the execution of which is invoked by a single, parameterized program instruction.

* * * * *

UNITED STATES PATENT AND TRADEMARK OFFICE
CERTIFICATE OF CORRECTION

PATENT NO. : 5,005,135

DATED : April 2, 1991

INVENTOR(S) : Morser et al.

It is certified that error appears in the above-identified patent and that said Letters Patent is hereby corrected as shown below:

Col. 1, line 58, after "Federate" insert --M  Miscellaneous Machine Functions--

Col. 9, line 21, after "FIG." insert --5--

Col. 10, line 57, "26b" should be --26a--

Col. 11, line 54, "M...$M_n$" should be --$M_z$...$M_n$--

Col. 12, line 18, "velooity" should be --velocity--

Col. 13, line 57, "/$2K_v^2$" should be --/$2R\ K_v^2$--

Col. 14, line 41, "P??.???R??." should be --P??.????R??.--

Col. 14, line 54, "clearnce" should be --clearance--

Col. 14, line 55, "i" should be --it--

Col. 14, line 57, "he" should be --the--

Col. 16, line 57, after "D=ABS" insert --[R2-2R1]--

Col. 19, line 41, "CRT 26b" should be --CRT 26a--

Col. 20, line 7, "b" should be --be--

UNITED STATES PATENT AND TRADEMARK OFFICE
CERTIFICATE OF CORRECTION

PATENT NO. : 5,005,135

DATED : April 2, 1991

INVENTOR(S) : Morser et al.

It is certified that error appears in the above-identified patent and that said Letters Patent is hereby corrected as shown below:

Col. 20, line 20, "Factive" should be --$F_{active}$--

Col. 24, line 9, "$K_4$" should be --$K_v$--

Col. 24, line 19, after 2 "=" should be --(-)--

Col. 24, line 34, "($K_{v1}$)" should be --($K_v$)--

Col. 24, line 35, "he" should be --the--

Col. 24, line 45, after "R/" delete "V"

Col. 25, line 17, "$Q_{a1}$" should be --$Q_L$--

Col. 26, line 19, after "loop" insert --gain, ($K_v$) and a velocity loop integral time, ($T_i$),--

Col. 27, line 28, delete "D=ABS"

Col. 28, line 7, "int he" should be --in the--

UNITED STATES PATENT AND TRADEMARK OFFICE
CERTIFICATE OF CORRECTION

PATENT NO. : 5,005,135

DATED : April 2, 1991

INVENTOR(S) : Morser et al.

It is certified that error appears in the above-identified patent and that said Letters Patent is hereby corrected as shown below:

Col. 31, line 19, "int he" should be --in the--

Signed and Sealed this

Twenty-first Day of September, 1993

Attest:

Attesting Officer

BRUCE LEHMAN

Commissioner of Patents and Trademarks